(12) United States Patent
Ikriannikov

(10) Patent No.: US 9,767,947 B1
(45) Date of Patent: Sep. 19, 2017

(54) COUPLED INDUCTORS ENABLING INCREASED SWITCHING STAGE PITCH

(71) Applicant: Volterra Semiconductor LLC, San Jose, CA (US)

(72) Inventor: Alexandr Ikriannikov, Castro Valley, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 0 days.

(21) Appl. No.: 14/805,981

(22) Filed: Jul. 22, 2015

Related U.S. Application Data

(62) Division of application No. 13/039,219, filed on Mar. 2, 2011, now abandoned.

(51) Int. Cl.
*H01F 27/28* (2006.01)
*H01F 5/04* (2006.01)
*H02M 3/158* (2006.01)

(52) U.S. Cl.
CPC ............ *H01F 5/04* (2013.01); *H02M 3/1584* (2013.01); *H01F 2005/043* (2013.01)

(58) Field of Classification Search
CPC . H01F 5/04; H01F 27/38; H01F 27/39; H01F 30/04; H01F 41/10; H01F 37/00; H01F 3/14; H02M 3/1588; H02M 3/1584; H02M 3/156; H02M 3/157
USPC ....... 336/170, 212, 221, 178, 192, 222, 184, 336/214, 215; 323/271, 272, 282–285
See application file for complete search history.

(56) References Cited

U.S. PATENT DOCUMENTS

| | | | |
|---|---|---|---|
| 2,170,446 A | 8/1939 | Edwards |
| 2,212,543 A | 8/1940 | Jovy |
| 2,298,935 A | 10/1942 | Freeman |
| 2,403,393 A | 7/1946 | Peterson |
| 3,671,847 A | 6/1972 | Shibano |
| 4,455,545 A | 6/1984 | Shelly |
| 4,488,136 A | 12/1984 | Hansen et al. |
| 5,023,578 A | 6/1991 | Kaneko et al. |
| 5,161,098 A | 11/1992 | Balakrishnan |
| 5,177,460 A | 1/1993 | Dhyanchand et al. |

(Continued)

FOREIGN PATENT DOCUMENTS

| | | |
|---|---|---|
| EP | 0 012 629 | 6/1980 |
| EP | 0 755 060 | 1/1997 |

(Continued)

OTHER PUBLICATIONS

Chandrasekaran, S. et al., "Integrated Magnetics for Interleaved DC-DC Boost for Fuel Cell Powered Vehicles," 35th Annual IEEE Power Electronics Specialists Conferences, 356-61 (2004).

(Continued)

*Primary Examiner* — Nguyen Tran
(74) *Attorney, Agent, or Firm* — Lathrop & Gage LLP

(57) ABSTRACT

A coupled inductor includes a first end magnetic element, a second end magnetic element, N connecting magnetic elements, and N windings, where N is an integer greater than one. Each of the N connecting magnetic elements connects to both of the first and second end magnetic elements. Each of the N windings is wound around a respective one of the N connecting magnetic elements such that the N windings are wound in alternating opposing directions. Possible applications of the coupled inductor include, but are not limited to, switching power converter applications.

11 Claims, 16 Drawing Sheets

(56) References Cited

U.S. PATENT DOCUMENTS

| | | | |
|---|---|---|---|
| 5,182,535 A | 1/1993 | Dhyanchand | |
| 5,204,809 A | 4/1993 | Andresen | |
| 5,225,971 A | 7/1993 | Spreen | |
| 5,353,001 A | 10/1994 | Meinel et al. | |
| 5,436,818 A | 7/1995 | Barthold | |
| 5,469,334 A | 11/1995 | Balakrishnan | |
| 5,568,111 A | 10/1996 | Metsler | |
| 5,574,420 A | 11/1996 | Roy et al. | |
| 5,631,822 A | 5/1997 | Silberkleit et al. | |
| 5,642,249 A | 6/1997 | Kuznetsov | |
| 5,731,666 A | 3/1998 | Folker et al. | |
| 5,737,203 A | 4/1998 | Barrett | |
| 5,764,500 A | 6/1998 | Matos | |
| 5,847,518 A * | 12/1998 | Ishiwaki | H01F 3/14 315/276 |
| 5,939,966 A | 8/1999 | Shin' Ei | |
| 6,018,468 A | 1/2000 | Archer et al. | |
| 6,060,977 A | 5/2000 | Yamamoto et al. | |
| 6,114,932 A | 9/2000 | Wester et al. | |
| 6,147,584 A | 11/2000 | Shin'ei | |
| 6,304,460 B1 | 10/2001 | Cuk | |
| 6,342,778 B1 | 1/2002 | Catalano et al. | |
| 6,348,848 B1 | 2/2002 | Herbert | |
| 6,362,986 B1 | 3/2002 | Schultz et al. | |
| 6,377,155 B1 | 4/2002 | Allen et al. | |
| 6,388,896 B1 | 5/2002 | Cuk | |
| 6,420,953 B1 | 7/2002 | Dadafshar | |
| 6,549,111 B1 | 4/2003 | De Graaf et al. | |
| 6,714,428 B2 | 3/2004 | Huang et al. | |
| 6,737,951 B1 | 5/2004 | Decristofaro et al. | |
| 6,765,468 B2 | 7/2004 | Chen et al. | |
| 6,784,644 B2 | 8/2004 | Xu et al. | |
| 6,791,444 B1 | 9/2004 | Masuda et al. | |
| 6,856,230 B2 | 2/2005 | Lu | |
| 6,867,678 B2 | 3/2005 | Yang | |
| 6,980,077 B1 | 12/2005 | Chandrasekaran et al. | |
| 7,187,263 B2 | 3/2007 | Vinciarelli | |
| 7,199,695 B1 | 4/2007 | Zhou et al. | |
| 7,233,132 B1 | 6/2007 | Dong et al. | |
| 7,239,530 B1 | 7/2007 | Djekic et al. | |
| 7,248,139 B1 | 7/2007 | Podlisk et al. | |
| 7,259,648 B2 | 8/2007 | Matsutani et al. | |
| 7,280,025 B2 | 10/2007 | Sano | |
| 7,292,128 B2 | 11/2007 | Hanley | |
| 7,315,463 B2 | 1/2008 | Schrom et al. | |
| 7,317,305 B1 | 1/2008 | Stratakos et al. | |
| 7,352,269 B2 | 4/2008 | Li et al. | |
| 7,425,883 B2 | 9/2008 | Matsutani et al. | |
| 7,498,782 B2 * | 3/2009 | Nguyen | G06F 1/26 323/271 |
| 7,498,920 B2 | 3/2009 | Sullivan et al. | |
| 7,504,808 B2 | 3/2009 | Schrom et al. | |
| 7,525,406 B1 | 4/2009 | Cheng | |
| 7,525,408 B1 | 4/2009 | Li et al. | |
| 7,548,046 B1 | 6/2009 | Stratakos et al. | |
| 7,567,163 B2 | 7/2009 | Dadafshar et al. | |
| 7,759,919 B2 * | 7/2010 | Bernacchia | H02M 3/1584 323/272 |
| 7,880,577 B1 | 2/2011 | Glaser et al. | |
| 7,994,888 B2 | 8/2011 | Ikriannikov | |
| 2001/0043135 A1 | 11/2001 | Yamada et al. | |
| 2002/0067234 A1 | 6/2002 | Kung | |
| 2002/0093413 A1 | 7/2002 | Shin'ei | |
| 2004/0085173 A1 | 5/2004 | Decristofaro et al. | |
| 2004/0130426 A1 | 7/2004 | Suzuki | |
| 2005/0024179 A1 | 2/2005 | Chandrasekaran et al. | |
| 2006/0049907 A1 | 3/2006 | Liu | |
| 2006/0089022 A1 | 4/2006 | Sano | |
| 2006/0145804 A1 | 7/2006 | Matsutani et al. | |
| 2006/0158297 A1 | 7/2006 | Sutardja | |
| 2006/0197510 A1 | 9/2006 | Chandrasekaran | |
| 2007/0175701 A1 | 8/2007 | Xu et al. | |
| 2007/0176726 A1 * | 8/2007 | Xu | H02M 3/1584 336/229 |
| 2007/0268104 A1 | 11/2007 | Chan et al. | |
| 2008/0012674 A1 | 1/2008 | Sano et al. | |
| 2008/0024259 A1 | 1/2008 | Chandrasekaran et al. | |
| 2008/0150666 A1 | 6/2008 | Chandrasekaran et al. | |
| 2008/0169769 A1 | 7/2008 | Lee | |
| 2008/0205098 A1 | 8/2008 | Xu et al. | |
| 2009/0179723 A1 * | 7/2009 | Ikriannikov | H01F 17/06 336/200 |
| 2009/0231081 A1 | 9/2009 | Ikriannikov et al. | |
| 2009/0237197 A1 | 9/2009 | Ikriannikov et al. | |
| 2010/0007457 A1 | 1/2010 | Yan et al. | |
| 2011/0018669 A1 | 1/2011 | Ikriannikov | |
| 2011/0032068 A1 | 2/2011 | Ikriannikov | |
| 2011/0035607 A1 | 2/2011 | Ikriannikov | |
| 2011/0050191 A1 | 3/2011 | Tsuji et al. | |
| 2011/0148559 A1 | 6/2011 | Ikriannikov | |
| 2012/0056704 A1 | 3/2012 | Nagano et al. | |

FOREIGN PATENT DOCUMENTS

| | | |
|---|---|---|
| EP | 1 519 392 | 3/2005 |
| EP | 1 632 964 | 3/2006 |
| JP | 08-250332 | 9/1996 |
| JP | 2000-164431 | 6/2000 |
| JP | 2005-310865 | 11/2005 |
| WO | WO 2006/026674 | 3/2006 |

OTHER PUBLICATIONS

Cooper Bussmann, "Product Data Sheet for Low Profile Inductor (Surface Mount)" retrieved from http://www.angliac.com, May 2003.

Dong et al., Twisted Core Coupled Inductors for Microprocessor Voltage Regulators, Power Electronics Specialists Conference, pp. 2386-2392, Jun. 17-21, 2007.

Dong et al., The Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Pulse Product News Press Release dated Nov. 25, 2008, 1 page.

Pulse, SMT Power Inductors datasheet, 2 pages, Nov. 2007.

Pulse, SMT Power Inductors Power Beads—PA0766NL Series; pp. 53-55; Mar. 2006.

Xu, J., et al; Analysis by Finite Element Method of a Coupled Inductor Circuit Used as Current Injection Interface; IEEE; pp. 147-151; 1996.

* cited by examiner

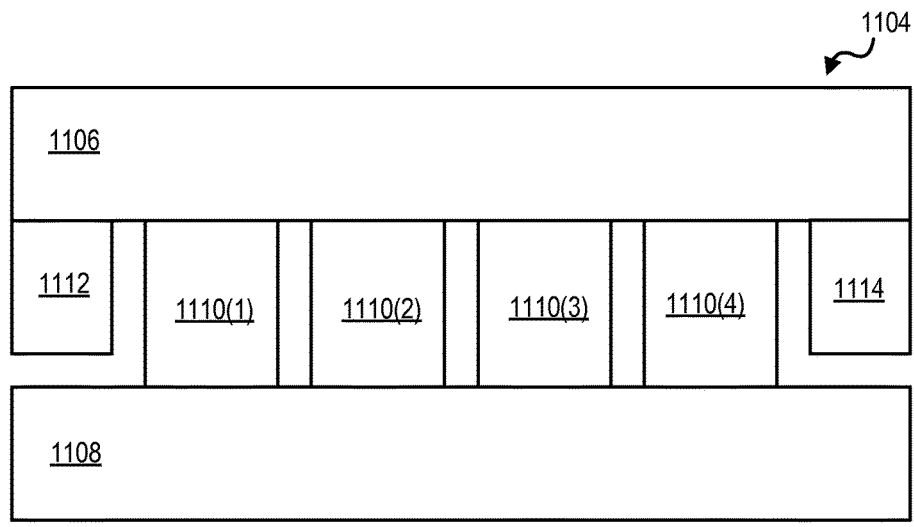
FIG. 13
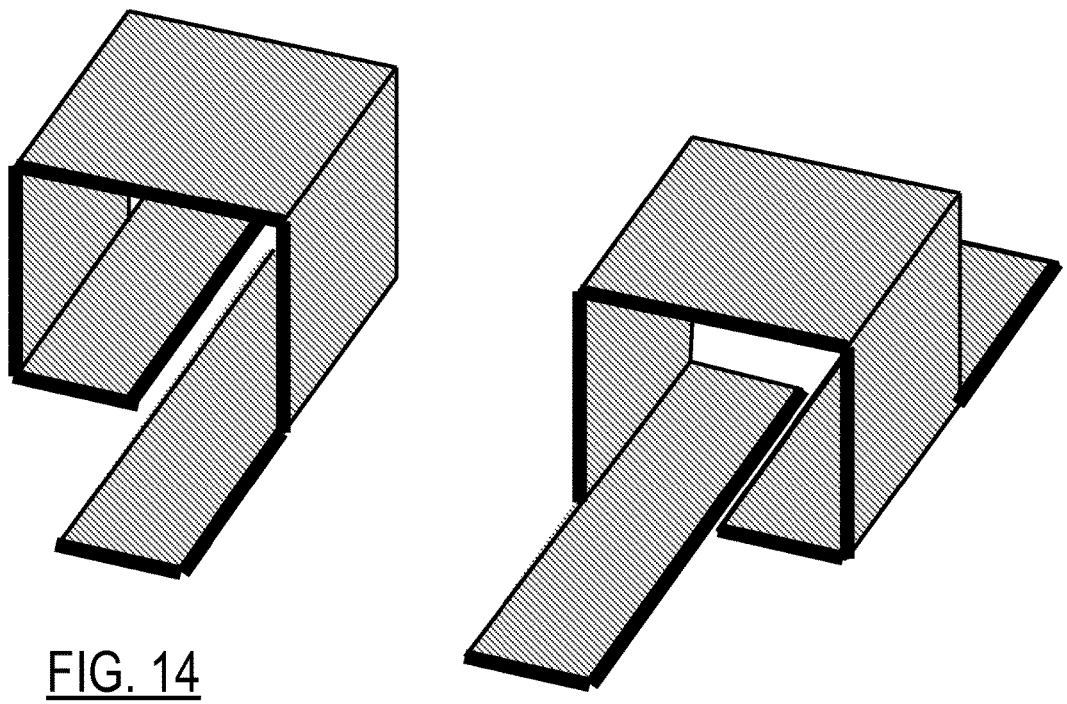
FIG. 14
FIG. 15

COUPLED INDUCTORS ENABLING INCREASED SWITCHING STAGE PITCH

RELATED APPLICATIONS

This application is a divisional of U.S. patent application Ser. No. 13/039,219 filed Mar. 2, 2011, which is incorporated herein by reference.

BACKGROUND

Switching power converters utilizing coupled inductors are known. In particular, U.S. Pat. No. 6,362,986 to Schultz et al., which is incorporated herein by reference, discloses, among other things, DC-to-DC converters including coupled inductors. These DC-to-DC converters typically have a higher effective switching frequency and a lower steady state peak-to-peak ripple magnitude than corresponding DC-to-DC converters utilizing discrete (uncoupled) inductors.

Coupled inductors that may be used in switching power converters have been proposed. For example, coupled inductors are disclosed in U.S. Patent Application Publication Number 2009/0237197 to Ikriannikov et al., which is incorporated herein by reference. FIG. 1 shows a perspective view and FIG. 2 shows a top plan view of a coupled inductor 100, which is similar to some of the coupled inductors featured in Publication Number 2009/0237197. FIG. 3 shows a top plan view of coupled inductor 100 with windings 102 omitted to show underlying features more clearly, and FIG. 4 shows a perspective view of one winding 102. In FIG. 2, windings 102 are represented by dashed lines where obscured by end magnetic elements 104, 106 in the top plan view.

Coupled inductor 100 includes a magnetic core 103 including first and second end magnetic elements 104, 106 and four connecting magnetic elements 108 (see FIG. 3). A respective winding 102 is wound around each connecting magnetic element 108. Each winding has a respective first end 110 extending under first end magnetic element 104, and each winding has a respective second end 112 extending under second end magnetic element 106 (see FIG. 2). In this disclosure, specific instances of an item may be referred to by use of a numeral in parentheses (e.g., winding 102(1)) while numerals without parentheses refer to any such item (e.g., windings 102).

As taught in U.S. Pat. No. 6,362,986, a switching power converter utilizing a coupled inductor must be configured to achieve proper magnetic coupling between the windings, to realize the benefits associated with using a coupled inductor. Specifically, the switching power converter must be configured as follows to achieve such proper magnetic coupling between the windings: (1) magnetic flux generated by the windings constructively interferes when one winding is switched to an excitation voltage (e.g., an input voltage) and the remaining windings are switched to a control voltage (e.g., ground), and (2) magnetic flux generated by the windings effective collides when all of the windings are switched to either the excitation voltage or to the control voltage. Accordingly, proper magnetic coupling requires a suitable coupled inductor, as well as proper excitation of the inductor by the switching power converter.

For example, FIG. 5 is a schematic of a four-phase buck converter 500 that achieves proper magnetic coupling between windings utilizing coupled inductor 100. A first end 110 of each winding 102 is electrically coupled to a respective switching node 502. Each switching node 502 is electrically coupled to an input power source 504 via a respective switching device 506, as well as to a control voltage rail 508 (e.g., ground) via a respective diode 510. Each pair of switching device 506 and diode 510 electrically coupled to a common switching node 502 is sometimes referred to as a switching stage 512. A second end 112 of each winding 102, as well as a filter 514, are electrically coupled to an output node 516.

A controller 518 monitors output node 516 via a feedback line 520 and causes switching devices 506 to repeatedly switch between their conductive and non-conductive states via control lines or a control bus (not shown) to regulate voltage on output node 516 and/or current delivered to a load (not shown) from output node 516. Controller 518 switches each switching device 506 out of phase (e.g., 90 degrees out of phase) with respect to each other switching device 506. Diodes 510 provide a path for current flowing through windings 102 when switching devices 506 turn off.

The configuration of coupled inductor 100 requires that either (1) all of its winding's first ends 110 are electrically coupled to respective switching nodes 502 (as shown in FIG. 5), or (2) all its winding's second ends 112 are electrically coupled to respective switching nodes 502, to achieve proper magnetic coupling in buck converter 500. As known in the art, electrical connections between switching stages 512 and windings 102 need to be short to prevent excessive resistive losses and parasitic ringing at the connections. Typical configurations of coupled inductor 100 dictate that all switching stages 512 be disposed on a common side of coupled inductor 100 to be near either first ends 112 or second ends 112 of windings 102.

For example, FIG. 6 shows a printed circuit board (PCB) layout 600, which is one possible PCB layout of buck converter 500 that achieves proper magnetic coupling with coupled inductor 100. Rectangle 602 represents the outline of coupled inductor 100. Each first end 110 of each winding 102 electrically couples to a respective switching node pad 604, which is in turn electrically coupled to a respective switching stage 512 via a respective circuit trace 606. Each second end 112 is electrically coupled to a respective output pad 608, which forms part of output node 516. Switching stages 512 are disposed on a common side 610 of coupled inductor 100 to be near the first ends 110 of their respective windings 102. Switching stages 512 have a pitch 612 with spacing 614 between adjacent switching stages.

SUMMARY

In an embodiment, a coupled inductor includes a first end magnetic element, a second end magnetic element, N connecting magnetic elements, and N windings, where N is an integer greater than one. Each of the N connecting magnetic elements connects to both of the first and second end magnetic elements. Each of the N windings is wound around a respective one of the N connecting magnetic elements such that the N windings are wound in alternating opposing directions. Possible applications of the coupled inductor include, but are not limited to, switching power converter applications.

In an embodiment, a coupled inductor includes a ladder style magnetic core including at least two rungs, and a respective winding wound around each rung such that the windings are wound in alternating opposing directions. Possible applications of the coupled inductor include, but are not limited to, switching power converter applications.

In an embodiment, a coupled inductor includes a first end magnetic element, a second end magnetic element, first and second connecting magnetic elements, and first and second windings. Each of the first and second connecting magnetic elements connects to both of the first and second end magnetic elements. The first winding has a first end extending under the first end magnetic element and a second end extending under the second end magnetic element. The first winding is wound around the first connecting magnetic element such that current flowing through the first winding from its first end to its second end induces a magnetic flux flowing through the first connecting magnetic element into the first end magnetic element. The second winding has a first end extending under the first end magnetic element and a second end extending under the second end magnetic element. The second winding is wound around the second connecting magnetic element such that current flowing through the second winding from its first end to its second end induces a magnetic flux flowing through the second connecting magnetic element into the second end magnetic element. Possible applications of the coupled inductor include, but are not limited to, switching power converter applications.

In an embodiment, a switching power converter includes a coupled inductor and N switching stages disposed on alternating sides of the coupled inductor, where N is an integer greater than one. The coupled inductor includes first and second end magnetic elements, N connecting magnetic elements, and N windings. Each connecting magnetic element is connected to both of the first and second end magnetic elements, and each of the windings is wound around a respective one of the connecting magnetic elements. Each switching stage switches a first end of a respective one of the windings between at least two different power rails at a frequency of at least 100 kilohertz.

BRIEF DESCRIPTION OF THE DRAWINGS

FIG. 13 shows a top plan view of the coupled inductor of FIG. 11 with the windings omitted.

FIG. 14 shows a perspective view of two of the windings of the coupled inductor of FIG. 11, and FIG. 15 shows a perspective view of another two of the windings of the coupled inductor of FIG. 11.

DETAILED DESCRIPTION

Figure 1:
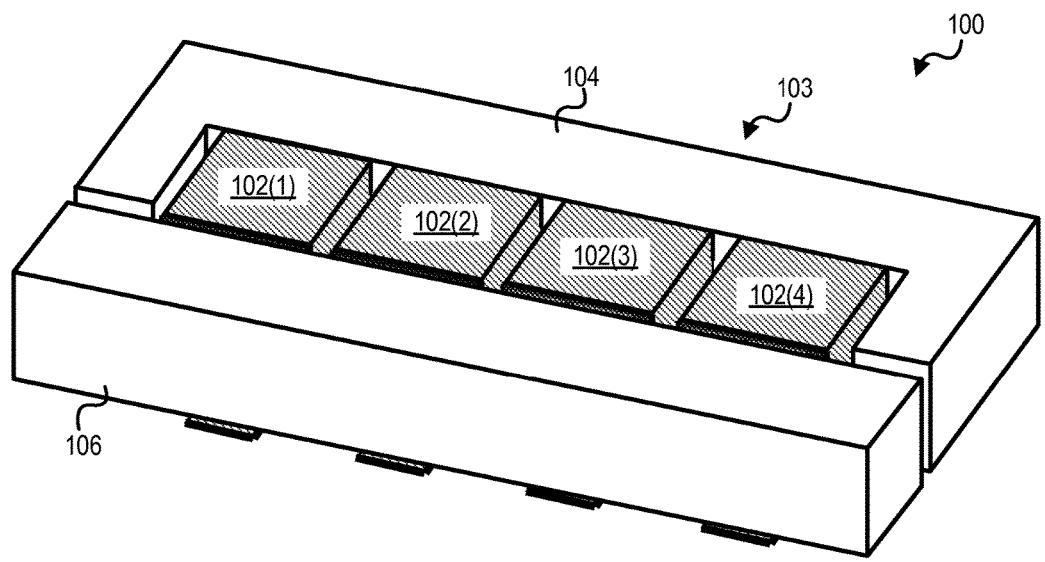
FIG. 1 shows a perspective view of a prior art coupled inductor.
Figure 2:
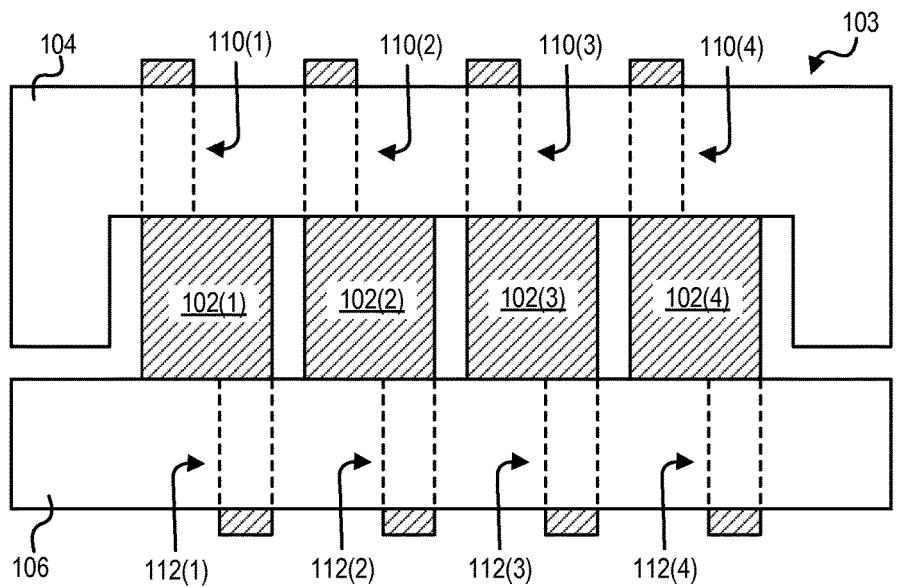
FIG. 2 shows a top plan view of the coupled inductor of FIG. 1
Figure 3:
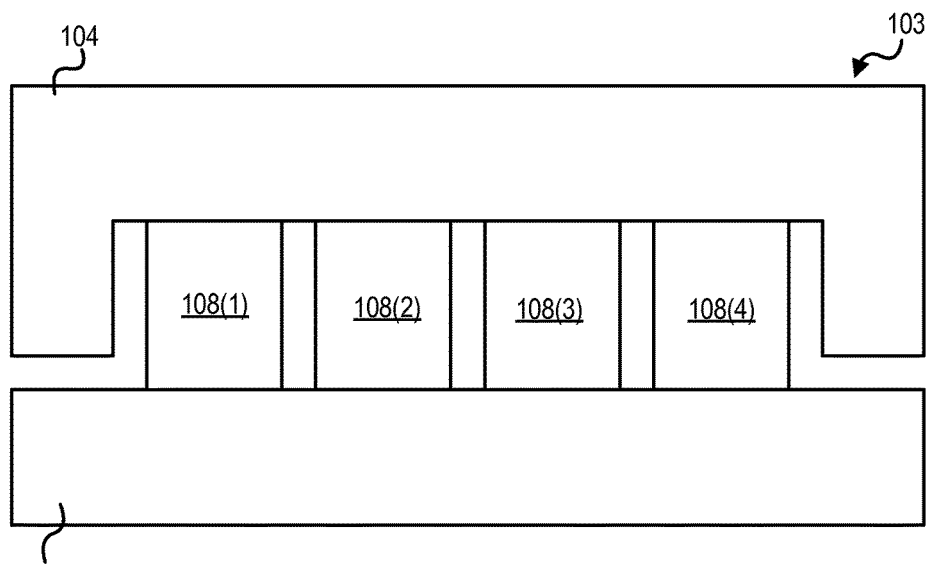
FIG. 3 shows a top plan view of the coupled inductor of FIG. 1 with its windings omitted.
Figure 4:
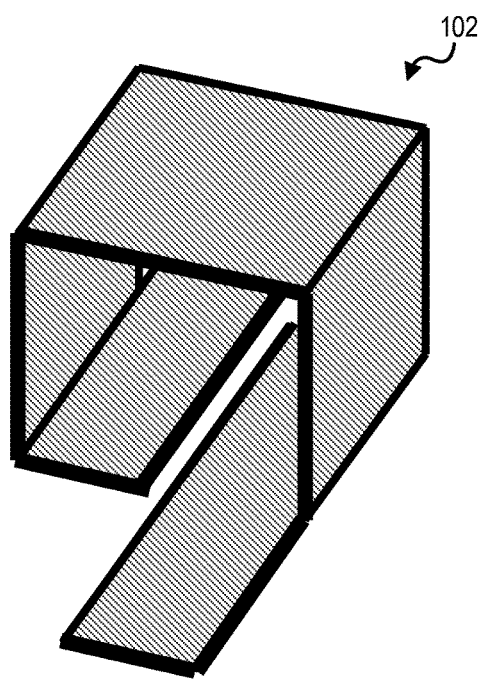
FIG. 4 shows one winding of the coupled inductor of FIG. 1.
Figure 5:
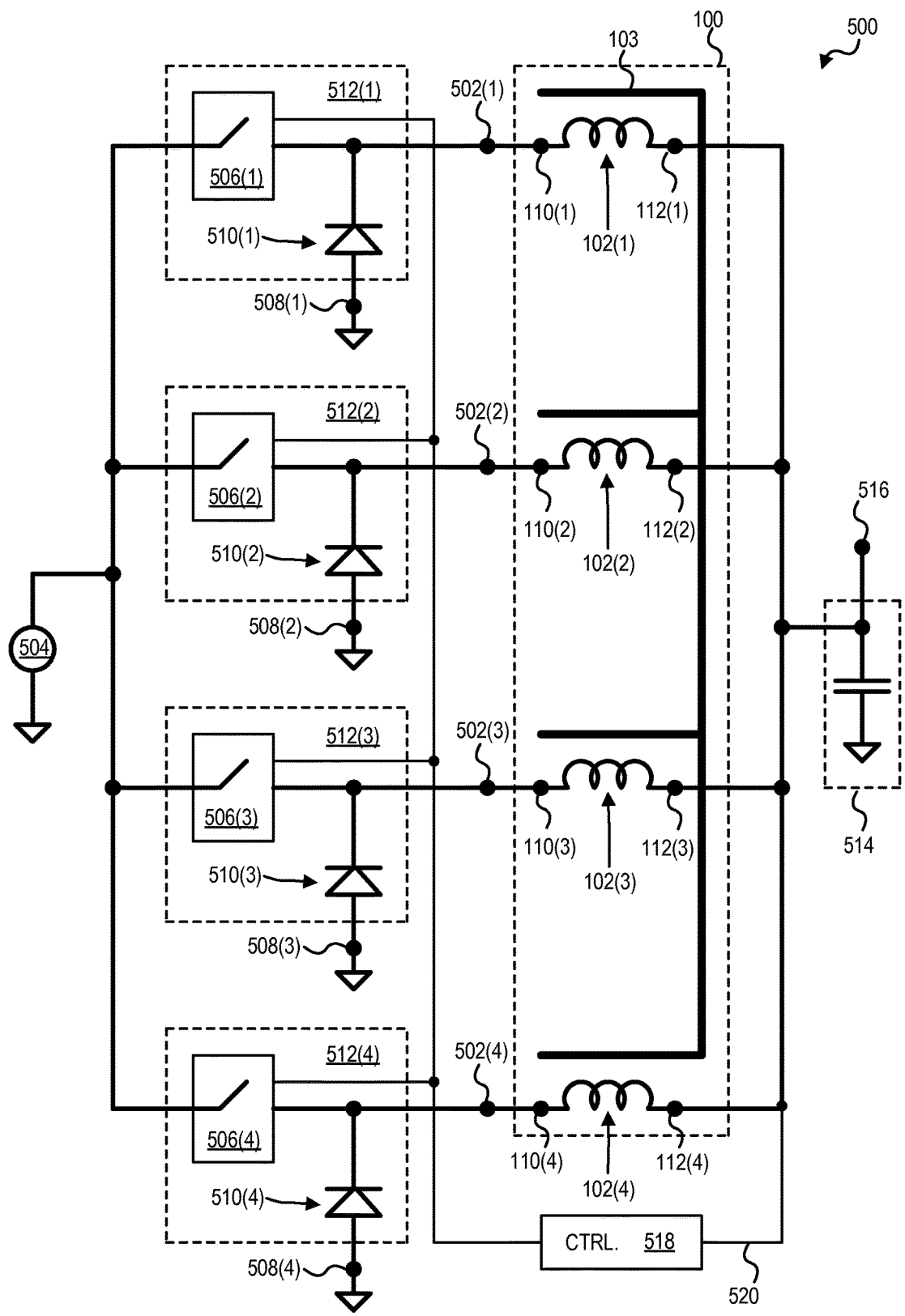
FIG. 5 shows a prior art four-phase buck converter utilizing the coupled inductor of FIG. 1.
Figure 6:
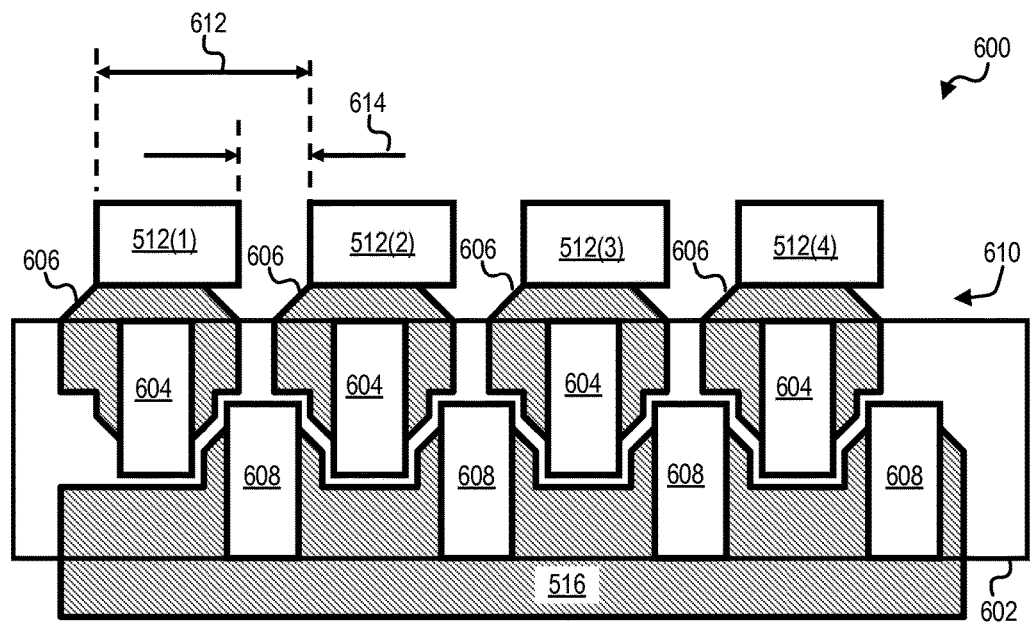
FIG. 6 shows one possible PCB layout of the buck converter of FIG. 5.

As discussed above, the configuration of coupled inductor 100 typically requires that all of its associated switching stages (e.g., switching stages 512) be disposed on a common side of coupled inductor 100 to prevent excessive interconnection losses and parasitic ringing, such as shown in the PCB layout of FIG. 6. Such restriction on switching stage placement may not be a drawback in many applications. For example, disposing all switching stages on a single side of coupled inductor 100 may advantageously allow use of a common heat sink to cool all instances of the switching stages, thereby potentially reducing switching power converter size and/or cost.

However, it may be desirable in certain applications to place switching stages on both sides of a coupled inductor. For example, as shown in the PCB layout of FIG. 6, placing all switching stages 512 on common side 610 of coupled inductor 100 typically results in a small pitch 612 between switching stages, thereby resulting in small spacing 614 between adjacent switching stages 512. Although such configuration may be desirable if a common heat sink is used to cool switching stages 512, it may be undesirable in applications where heat sink use is impractical, such as in portable electronic device applications (e.g., notebook computer, tablet computer, or mobile phone applications), or in applications where each switching stage is to have its own heat sink. In particular, we have determined that relative system thermal resistance may be significantly decreased by increasing pitch 612 between switching stages. Therefore, increasing pitch 612 may significantly improve cooling of switching stages 512, whether or not switching stages 512 include heat sinks.

Figure 7:
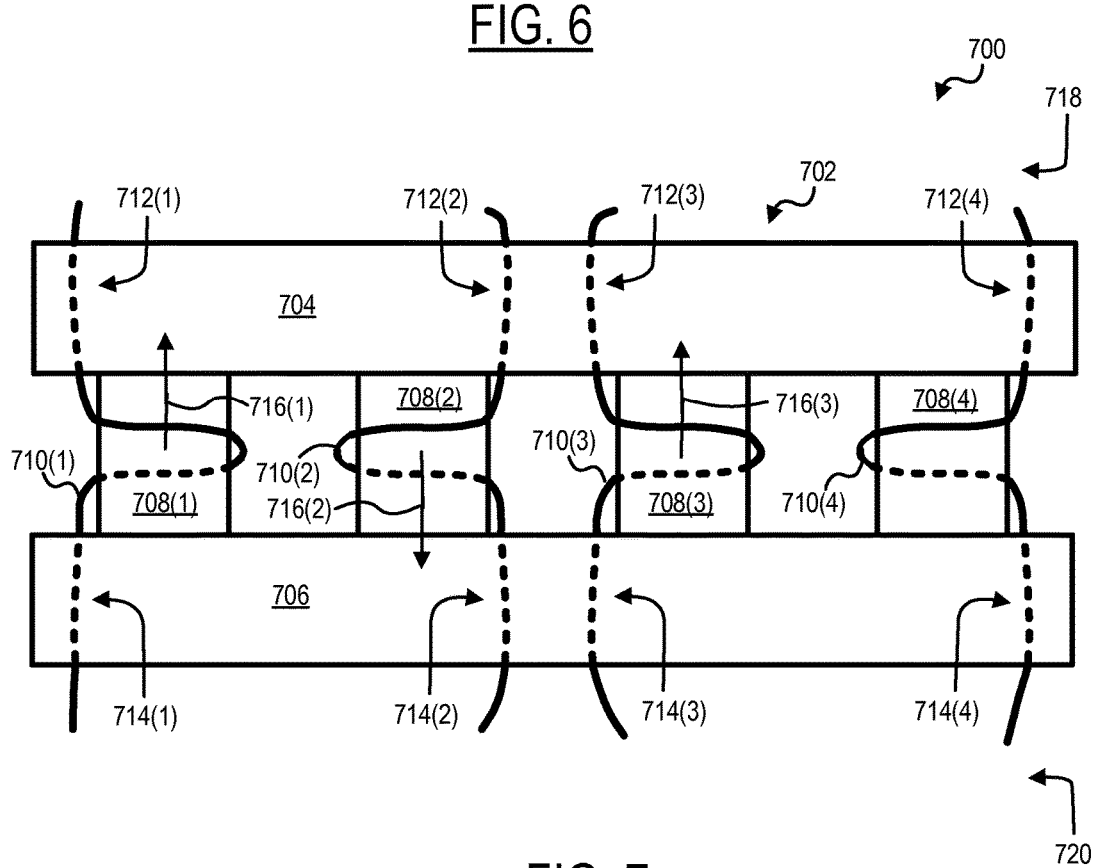
FIG. 7 shows a top plan view of one coupled inductor with windings having alternating opposing orientations, according to an embodiment.

We have developed coupled inductors that are scalable and facilitate placing switching stages on both sides of the coupled inductor, thereby enabling greater spacing between adjacent switching stages and promoting switching stage cooling. FIG. 7 shows a top plan view of an embodiment of a coupled inductor 700. Coupled inductor 700 has a magnetic core 702 including first and second end magnetic elements 704, 706 and N connecting magnetic elements 708 disposed between and connecting to end magnetic elements 704, 706. N is an integer greater than one, and coupled inductor 700 is therefore scalable. Magnetic core 702 can be considered to have a "ladder" style configuration, where end magnetic elements 704, 706 are analogous to ladder rails, and connecting magnetic elements 708 are analogous to ladder rungs. Magnetic elements 704, 706, 708 are typically formed of a magnetic material, such as a ferrite material or a powder iron material, suitable for use at high frequencies (e.g., frequencies of at least 100 kHz) common in switching power converters.

A respective winding 710 is wound around each connecting magnetic element 708. Each winding 710 has a respective first end 712 and a respective second end 714. First ends 712 typically extend under first end magnetic element 704, and second ends 714 typically extend under second end magnetic element 706, as shown in FIG. 7. However, windings 710 could be modified to not extend under first and/or second end magnetic element 704, 706. Windings 710 are wound around their connecting magnetic elements in alternating opposing directions. Therefore, windings 710 have alternating opposing orientations, which enables placement of switching stages on two opposing sides of coupled inductor 700, as discussed below. In particular, windings 710 are configured so that each winding of a given pair of adjacent windings 710 generates magnetic flux flowing in a different direction in magnetic core 702 when driven by current flowing in the same direction through the winding.

For example, consider pair of adjacent windings 710(1) and 710(2). Adjacent windings 710(1) and 710(2) have opposite orientations in that current flowing through winding 710(1) from its first end 712(1) to its second end 714(1) induces magnetic flux 716(1) flowing through connecting element 708(1) into first end magnetic element 704, while current flowing through winding 710(2) from its first end 712(2) to its second end 714(2) induces magnetic flux 716(2) flowing through connecting magnetic element 708(2) into second end magnetic element 706.

As another example, consider pair of adjacent windings 710(2) and 710(3). Adjacent windings 710(2) and 710(3) have opposite orientations in that current flowing through winding 710(2) from its first end 712(2) to its second end 714(2) induces magnetic flux 716(2) flowing through connecting magnetic element 708(2) into second end magnetic element 706 (as discussed above), while current flowing through winding 710(3) from its first end 712(3) to its second end 714(3) induces magnetic flux 716(3) flowing through connecting magnetic element 708(3) into first end magnetic element 704. Similarly, pair of adjacent windings 710(3) and 710(4) also have opposite orientations with respect to each other.

The fact that windings 710 have alternating opposing orientations facilitates placement of switching stages on opposing sides 718, 720 of coupled inductor 700 in switching power converter applications, thereby enabling significant spacing between adjacent switching stages. In particular, due to the fact that windings 710 have alternating opposing orientations, proper magnetic coupled between windings 710 is achieved when alternating first and second ends 712, 714 of windings 710 are electrically coupled to a respective switching stage. Thus, the configuration of coupled inductor 700 promotes placement of switching stages on alternating sides 718, 720 of coupled inductor 700, since alternating first and second ends 712, 714 are to be electrically coupled to respective switching stages.

Figure 8:
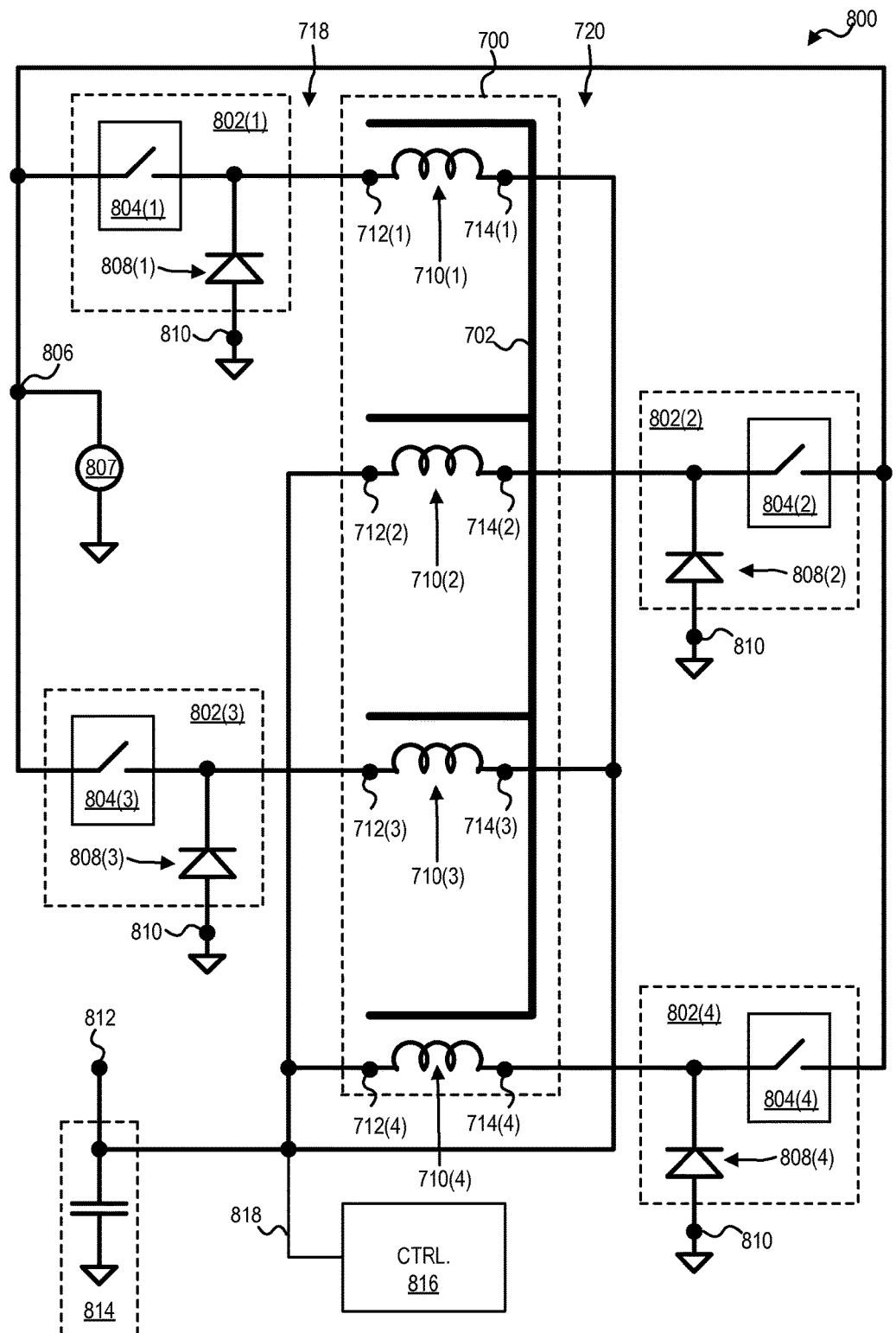
FIG. 8 shows one four-phase buck converter including the coupled inductor of FIG. 7, according to an embodiment.

For example, consider the four-phase buck DC-to-DC converter 800 of FIG. 8, which is one possible switching power converter application of coupled inductor 700. Due to the fact that windings 710 have alternating opposing orientations, proper magnetic coupled between windings 710 is achieved when alternating first and second ends 712, 714 of windings 710 are electrically coupled to a respective switching stage 802. In particular, first ends 712(1), 712(3) are electrically coupled to respective switching stages 802(1) and 802(3), while second ends 714(2), 714(4) are electrically coupled to respective switching stages 802(2) and 802(4). Since switching stages 802 should be placed near their respective windings 710 to prevent excessive losses and ringing, switching stages 802(1) and 802(3) are disposed on first side 718 of coupled inductor 700, while switching stages 802(2) and 802(4) are disposed on second side 720 of coupled inductor 700.

Each switching stage 802 includes a respective switching device 804 electrically coupled between an input power rail 806 and a respective winding 710. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier. An input power source 807 is electrically coupled to input power rail 806. Each switching stage 802 further includes a respective diode 808 electrically coupled between the winding and a reference power rail 810 (e.g., a ground rail). Each switching stage 802 may be formed of discrete components or partially or fully integrated into a common package.

Second ends 714(1), 714(3) of windings 710(1), 710(3) as well as first ends 712(2), 712(4) of windings 710(2), 710(4) are electrically coupled to a common output power rail 812. A filter 814, which typically includes at least a capacitor, is also electrically coupled to output power rail 812 to filter ripple current generated by switching of switching devices 804.

A controller 816 causes switching devices 804 to switch between their conductive and non-conductive states to provide power to a load (not shown) electrically coupled to output power rail 812. Controller 816 is optionally configured to also monitor output node 812 via a feedback line 818 and control switching of switching devices 804 to regulate voltage on output node 812 and/or current delivered to a load from output node 812. Controller 816 typically switches switching devices 804 between their conductive and non-conductive stages at a frequency of at least 100 kilohertz to prevent excessive ripple magnitude. In certain embodiments, controller 816 employs a pulse width modulation (PWM) and/or a pulse frequency modulation (PFM) control scheme to switch switching devices 804 and thereby regulate voltage on output power rail 812 and/or current delivered to a load from output power rail 812. It is anticipated that controller 816 will typically switch each switching device 804 out of phase with respect to each other switching device 804 to promote cancelation of ripple current on output power rail 812. Controller 816 interfaces with switching devices 804 via control lines and/or a control bus, which are not shown to promote illustrative clarity. In alternate embodiments, controller 816 is partially or fully integrated with one or more switching stages 802.

Diodes 808 perform a freewheeling function—that is, they provide a path for current through their respective windings 710 after switching devices 804 turn off. Thus, each switching stage 802(1) switches an end of a respective winding 710 between two different power rails—i.e., input power rail 806 and reference power rail 810. For example, switching stage 802 switches end 712(1) of winding 710(1) between input power rail 806 and reference power rail 810, and switching stage 802(2) switches end 714(2) of winding 710(2) between input power rail 806 and reference power rail 810. Although each switching stage 802 is shown in FIG. 8 as being powered from a common input power rail 806, converter 800 could be modified such that two or more switching stages 802 are powered from different power rails.

In certain embodiments, diodes 808 are Schottky diodes. Diodes 808 may alternately be replaced with switching devices operating under the command of controller 816, such as to reduce losses due to forward voltage drop across diodes 808. As is well known in the art, properly sized switching devices typically have a lower forward voltage drop than diodes. It may also be desirable to replace diodes 808 with switching devices to enable continuous conduction mode operation under light load conditions. Another possible reason for replacing diodes 808 with switching devices is to enable converter 800 to sink current, such as in memory termination voltage rail applications.

Various modifications to coupled inductor 700 are possible. For example, although coupled inductor 700 is shown is being a "four-phase" coupled inductor (i.e., it includes four windings), alternate embodiments may have any number of connecting magnetic elements 708 and associated windings 710 greater than one. Indeed, one advantage of coupled inductor 700 is that it is scalable, while enabling placement of switching stages on opposing sides 718, 720 of the coupled inductor.

Additionally, it is anticipated that certain embodiments of coupled inductor 700 will include one or more features to boost leakage inductance values associated with windings 710. Leakage inductance is an important parameter of coupled inductor 700 in switching power converter applications. In particular, leakage inductance must be sufficiently large to prevent excessive steady state peak-to-peak ripple magnitude. However, if leakage inductance is too large, the power converter's transient response will suffer.

Figure 9:
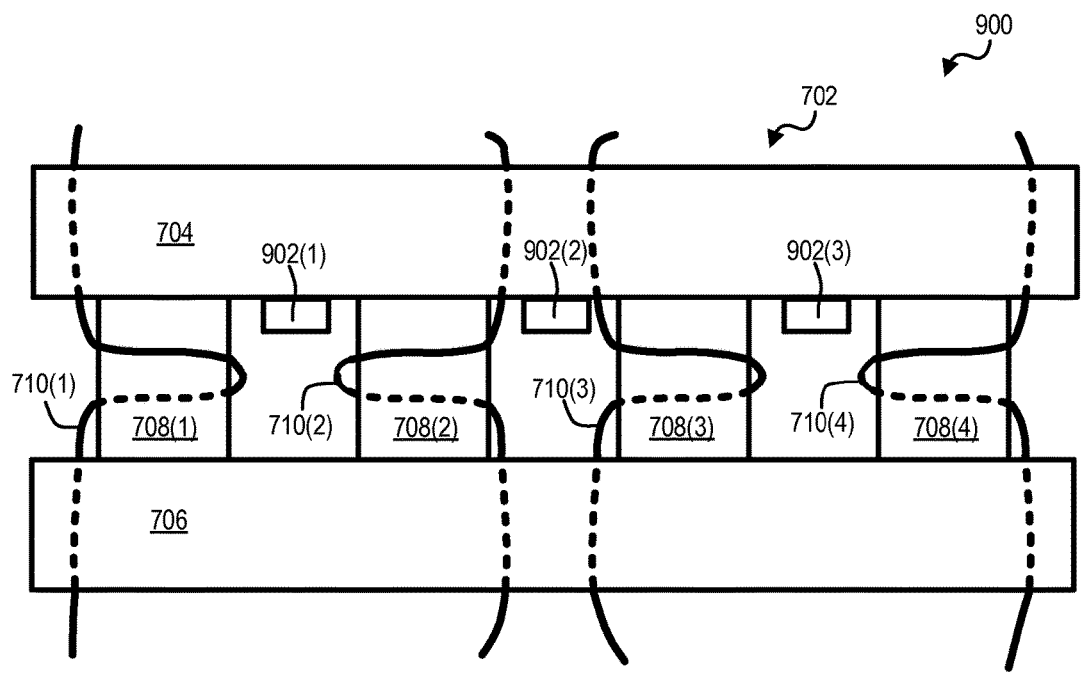
FIG. 9 shows a top plan view of a coupled inductor similar to the coupled inductor of FIG. 7, but including features to boost leakage inductance values associated with the windings, according to an embodiment.
Figure 10:
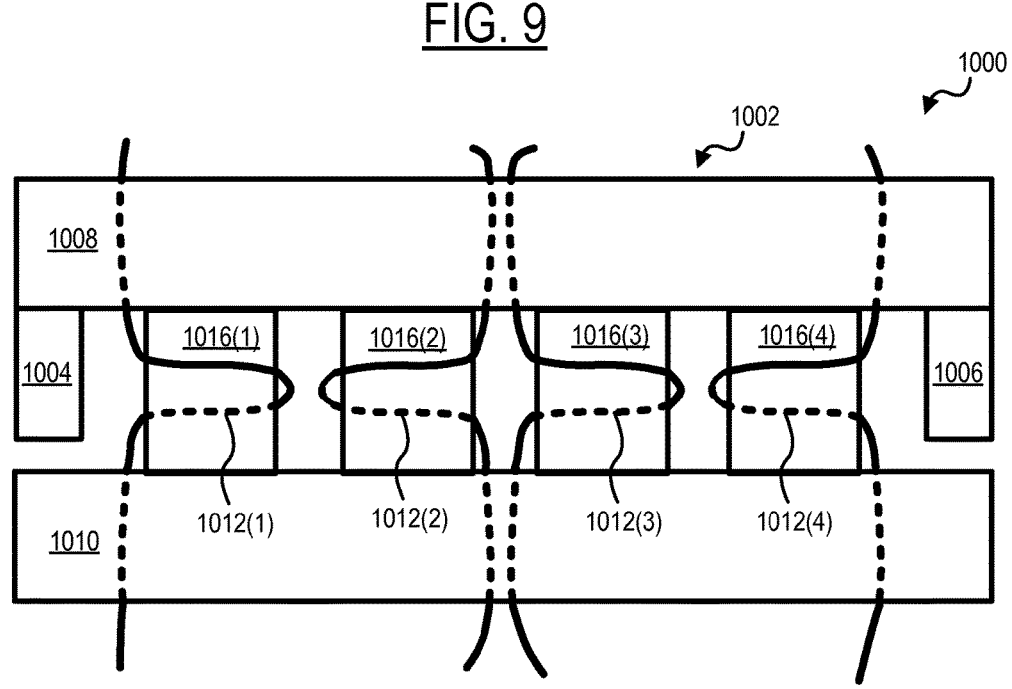
FIG. 10 shows a top plan view of a coupled inductor similar to the coupled inductor of FIG. 7, but where the magnetic core further includes gapped outer legs disposed between and connecting to the end magnetic elements, according to an embodiment.

FIG. 9 shows one variation of coupled inductor 700 with features to boost leakage inductance values associated with windings 710. Specifically, FIG. 9 shows a top plan view of coupled inductor 900, which is similar to coupled inductor 700, but includes magnetic extensions 902 disposed between pairs of adjacent connecting magnetic elements 708 to promote flow of leakage magnetic flux and thereby boost leakage inductance values associated with windings 710. As another example, FIG. 10 shows a coupled inductor 1000, which is similar to coupled inductor 700, but includes a magnetic core 1002 with gapped outer legs 1004, 1006 disposed between and connected to end magnetic elements 1008, 1010. Gapped outer legs 1004, 1006 provide a path for leakage magnetic flux and thereby contribute to the leakage inductance values associated with windings 1012. Similar to windings 710 coupled inductor 700, windings 1012 have alternating opposing orientations, and each winding 1012 is wound around a respective connecting magnetic element 1016.

Figure 11:
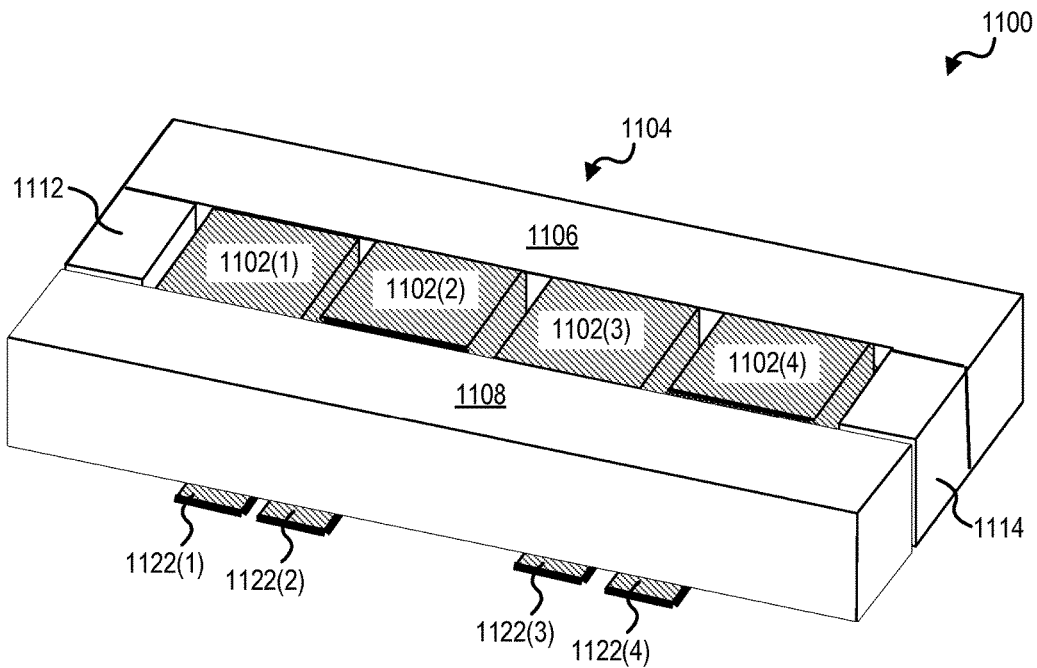
FIG. 11 shows a coupled inductor having foil style windings with alternating opposing orientations, according to an embodiment.
Figure 12:
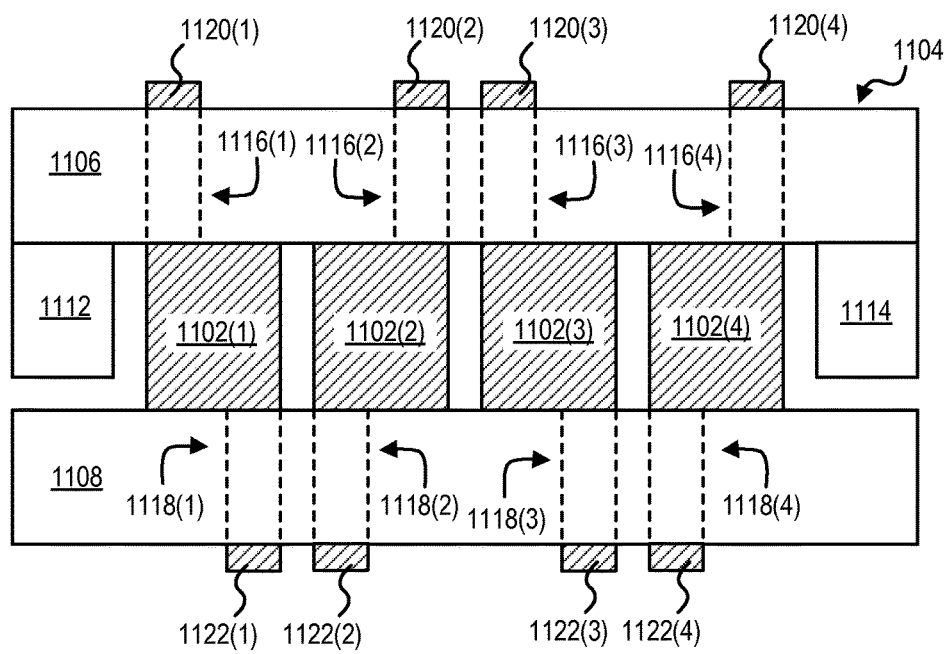
FIG. 12 shows a top plan view of the coupled inductor of FIG. 11.

Windings 710 of coupled inductor 700 can have various configurations. It is anticipated that many embodiments of coupled inductor 700 will have foil style windings to reduce winding impedance. For example, FIG. 11 shows a perspective view of a coupled inductor 1100, which is similar to coupled inductor 700, but includes foil style windings and gapped outer legs. FIG. 12 shows a top plan view of coupled inductor 1100, and FIG. 13 shows a top plan view of coupled inductor 1100 with windings 1102 omitted to show underlying features more clearly. The outlines of windings 1102 are shown by dashed lines in FIG. 12 where obscured by a magnetic core 1104 of coupled inductor 1100.

Magnetic core 1104 includes first and second end magnetic elements 1106, 1108, and N connecting magnetic elements 1110 disposed between and connecting to first and second end magnetic elements 1106, 1108, where N is an integer greater than one (see FIG. 13). Magnetic core 1104 further includes gapped outer legs 1112, 1114, each disposed between and connected to first and second end magnetic elements 1106, 1108 outside connecting magnetic elements 1110. Gapped outer legs 1112, 1114 provide a path for leakage magnetic flux, thereby boosting leakage inductance values associated with windings 1102.

Coupled inductor 1100 further includes N windings 1102, where each winding 1102 is wound around a respective connecting magnetic element 1110. Each winding 1102 is a foil style winding and has a respective first end 1116 extending under first end magnetic element 1106, as well as a respective second end 1118 extending under second end magnetic element 1108, as shown in FIG. 12. Each first end 1116 and each second end 1118 forms a respective solder tab 1120, 1122 configured for surface mount attachment to a printed circuit board. Windings 1102 have alternating opposite orientations. FIG. 14 shows a perspective view of one embodiment of winding 1102(1) and 1102(3), and FIG. 15 shows a perspective view of one embodiment of winding 1102(2), 1102(4).

Figure 16:
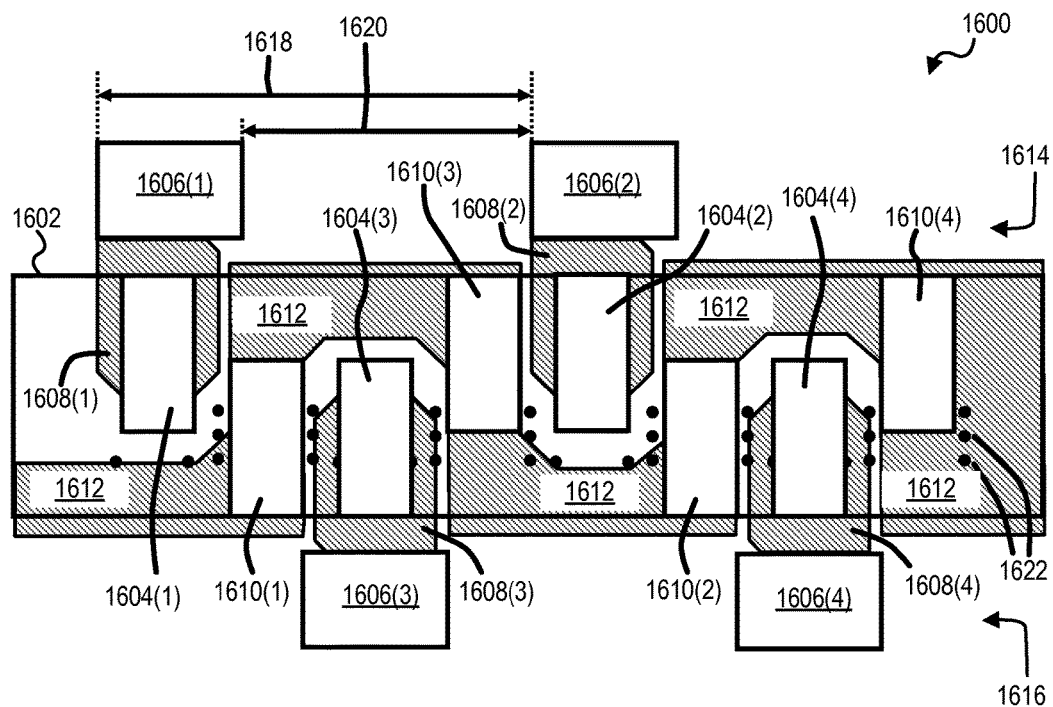
FIG. 16 shows one PCB layout that may be used with the coupled inductor of FIG. 11 in a buck converter application, according to an embodiment.

FIG. 16 shows a PCB layout 1600, which is one possible layout that may be used with coupled inductor 1100 in a buck converter application. Rectangle 1602 represents the outline of coupled inductor 1100. First ends 1116(1), 1116(3) of windings 1102(1), 1102(3) and second ends 1118(2), 1118(4) of windings 1102(2), 1102(4) electrically couple to respective switching node pads 1604, which are in turn electrically coupled to a respective switching stage 1606 via a respective circuit trace 1608. Second ends 1118(1), 1118(3) and first ends 1116(2), 1116(4) are electrically coupled to a respective output pad 1610 which form part of output node 1612. Switching stages 1606 are alternately disposed on opposite sides 1614, 1616 of coupled inductor 1100 to be near their respective windings 1102. Switching stages 1606 have a pitch 1618 with spacing 1620 between adjacent switching stages. It should be appreciated that spacing 1620 is significantly greater than spacing 614 of adjacent stages in PCB layout 600 (FIG. 6). Accordingly, the fact that windings 1102 have alternating opposing orientations enables a PCB layout incorporating coupled inductor 1100 to have relatively large spacing 1620 between adjacent switching stages 1606, thereby promoting cooling of switching stages 1606.

Layout 1600 is shown as further including a number of vias 1622 connecting certain traces to other traces or power planes (not shown). Only some of vias 1622 are labeled in FIG. 16 to promote illustrative clarity. However, layout 1600 need not include vias 1622, and the number and/or locations of vias 1622 can also be varied.

Figure 17:
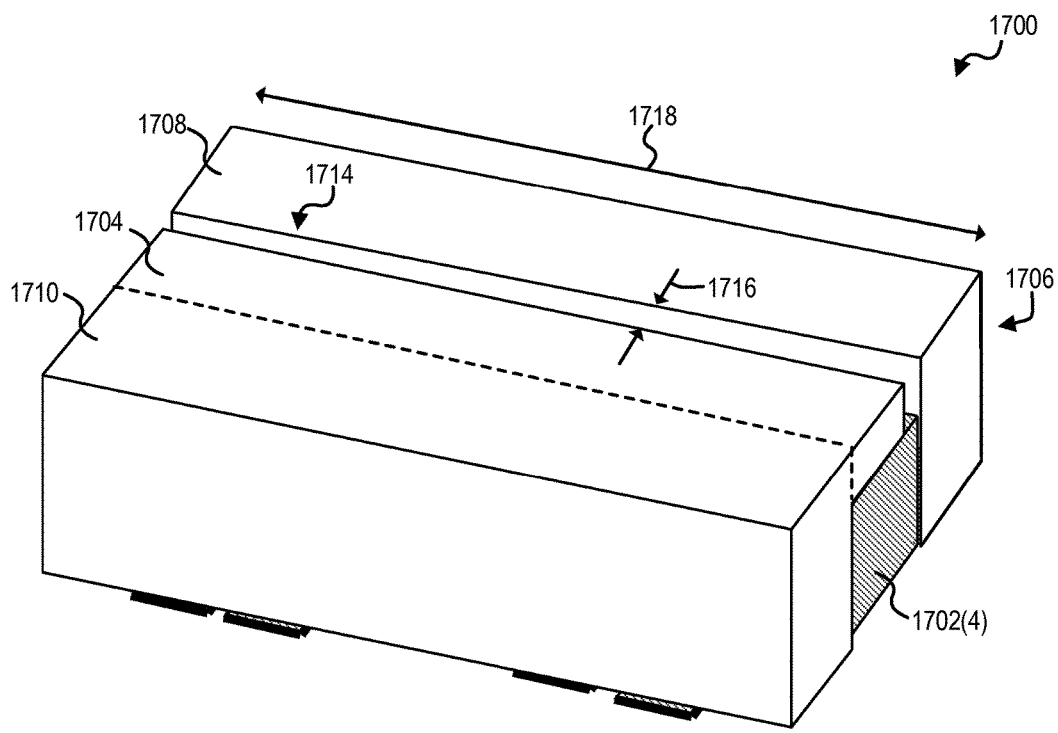
FIG. 17 shows another coupled inductor having foil style windings with alternating opposing orientations, according to an embodiment.
Figure 18:
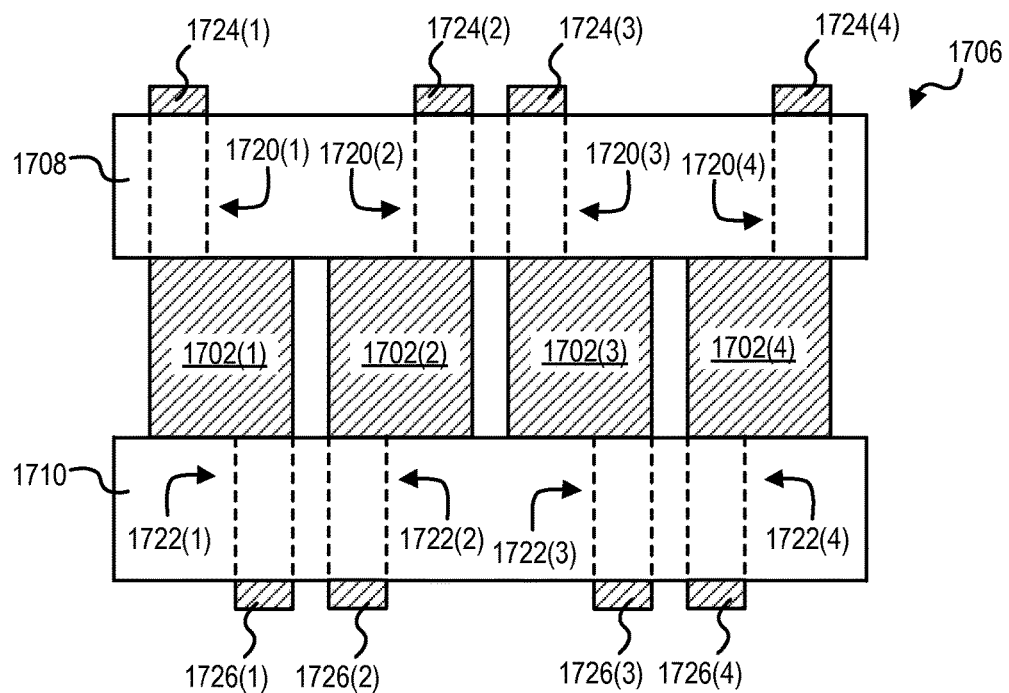
FIG. 18 shows a top plan view of the coupled inductor of FIG. 17 with a top magnetic element omitted.
Figure 19:
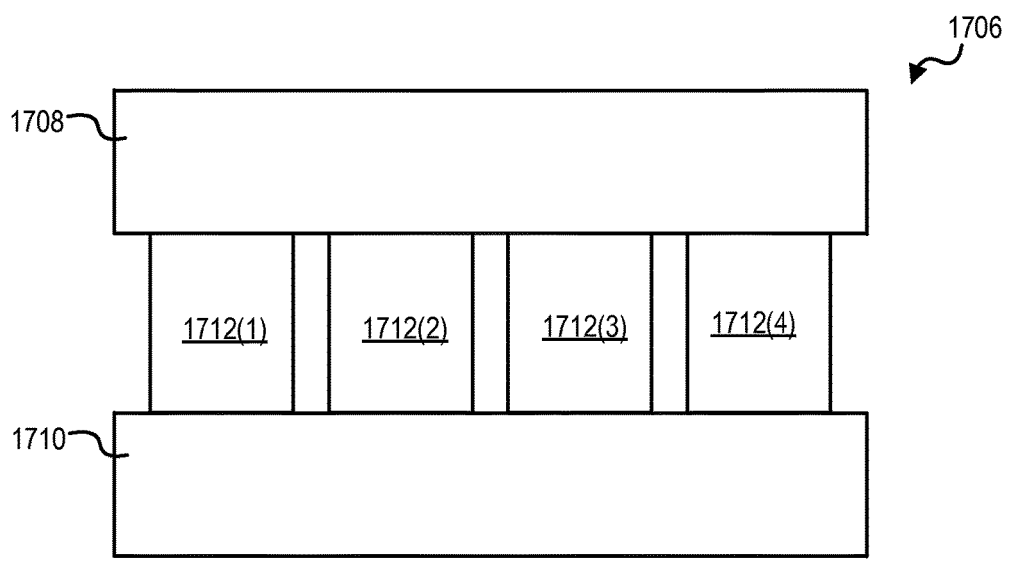
FIG. 19 shows a top plan view of the coupled inductor of FIG. 17 with the top magnetic element and windings omitted.

FIG. 17 shows a perspective view of a coupled inductor 1700, which is similar to coupled inductor 700, but includes foil style windings 1702 and a top magnetic element 1704. FIG. 18 shows a top plan view of coupled inductor 1700 with top magnetic element 1704 omitted, and FIG. 19 shows a top plan view of coupled inductor 1700 with both top magnetic element 1704 and windings 1702 omitted to show underlying features more clearly. The outlines of windings 1702 are shown by dashed lines in FIG. 18 where obscured by a magnetic core 1706 of coupled inductor 1700.

Magnetic core 1706 includes first and second end magnetic elements 1708, 1710, and N connecting magnetic elements 1712 disposed between and connecting to first and second end magnetic elements 1708, 1710, where N is an integer greater than one (see FIG. 19). Magnetic core 1704 further includes top magnetic element 1704 disposed over at least some of connecting magnetic elements 1712. Top magnetic element 1704 provides a magnetic flux path between first and second end magnetic elements 1708, 1710, thereby boosting leakage inductance associated within windings 1702. Top magnetic element 1704 may be combined with second end magnetic element 1710, as shown in FIG. 17. Alternately, top magnetic element 1704 may be combined with first end magnetic element 1708, or be a discrete component separate from first and second end magnetic elements, 1708, 1710.

Top magnetic element 1704 also forms at least one gap 1714 having a thickness 1716. Although gap 1714 is shown as extending along the entirety of length 1718 of coupled inductor 1700, gap 1714 could be configured to extend along only a portion of length 1718, such as if non-linear leakage inductance values are desired. Leakage inductance values associated with windings 1702 can be varied by changing thickness 1716 of gap 1714.

Figure 20:
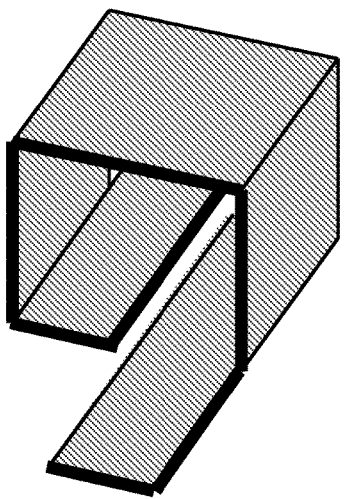
FIG. 20 shows a perspective view of two of the windings of the coupled inductor of FIG. 17.
Figure 21:
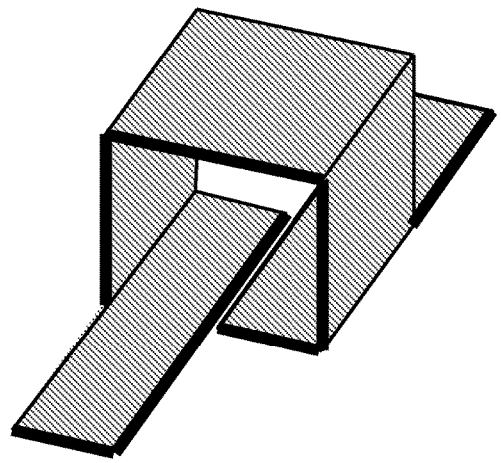
FIG. 21 shows a perspective view of another two of the windings of the coupled inductor of FIG. 17.

Coupled inductor 1700 further includes N windings 1702, where each winding 1702 is wound around a respective connecting magnetic element 1712. Each winding 1702 is a foil style winding and has a respective first end 1720 extending under first end magnetic element 1708, as well as a respective second end 1722 extending under second end magnetic element 1710, as shown in FIG. 18. Each first end 1720 and each second end 1722 forms a respective solder tab 1724, 1726 configured for surface mount attachment to a printed circuit board. Windings 1702 have alternating opposite orientations. FIG. 20 shows a perspective view of one embodiment of winding 1702(1) and winding 1702(3), and FIG. 21 shows a perspective view of one embodiment of winding 1702(2) and winding 1702(4).

Figure 22:
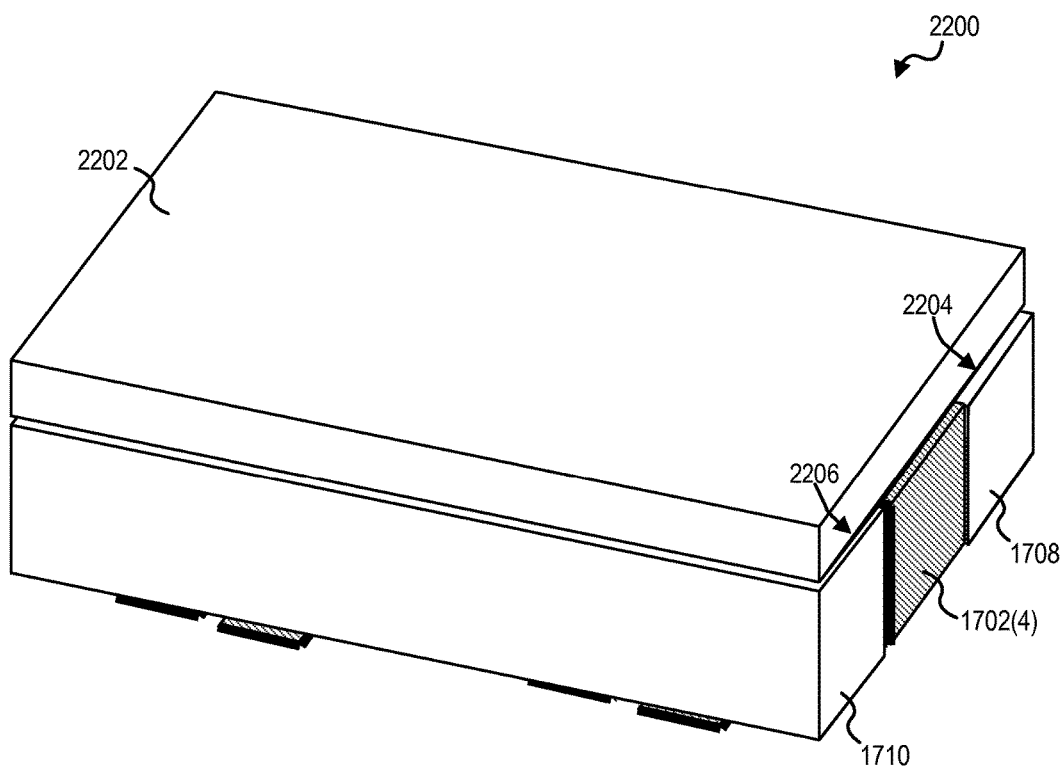
FIG. 22 shows an alternate embodiment of the coupled inductor of FIG. 17.

FIG. 22 shows a perspective view of coupled inductor 2200, which is similar to coupled inductor 1700 (FIG. 17), but with a top magnetic element having a different configuration than that of coupled inductor 1700. Specifically, coupled inductor 2200 includes a top magnetic element 2202 forming a first gap 2204 with first end magnetic element 1708, and a second gap 2206 with second end magnetic element 1710. Leakage inductance associated with windings 1702 may be varied by changing thickness of first 2204 and/or second gap 2206.

Figure 23:
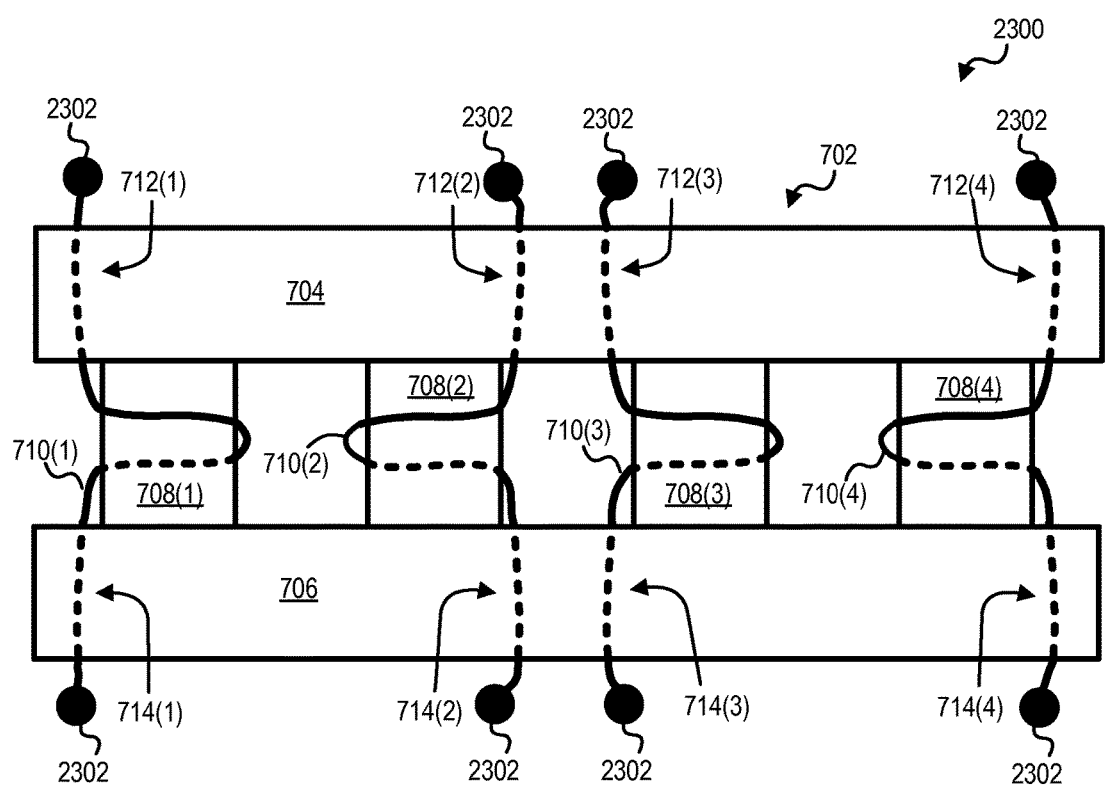
FIG. 23 shows a top plan view of one coupled inductor which is similar to the coupled inductor of FIG. 7, but further includes thru-hole pins, according to an embodiment.

It is further anticipated that in some embodiments of coupled inductor 700 (FIG. 7), some or all of windings 710 will be multi-turn windings. Use of multi-turn windings, instead of single turn windings, may be particularly desirable in instances where it is desired to increase inductance values associated with windings 710 without modifying magnetic core 702. Furthermore, certain embodiments of coupled inductor 700 include solder tabs and/or thru-hole pins for electrically and physically coupling windings 710 to a printed circuit board. Such solder tabs may be discrete components coupled to windings 710. Alternately, solder tabs may be integral with windings 710, as shown, for example, where solder tabs 1120, 1122 are integral with first and second ends 1116, 1118 of windings 1102 in coupled inductor 1100 (FIG. 12). FIG. 23 shows a top plan view coupled inductor 2300, which is similar to coupled inductor 700, but further includes a thru-hole solder pin 2302 electrically coupled to each first end 712 and each second end 714 of windings 710.

As discussed above, one possible application of coupled inductor 700 is in a multi-phase buck converter, such as four-phase buck converter 800 of FIG. 8. However, coupled inductor 700 is not limited to four-phase buck converters. For example, coupled inductor 700 can be used in buck converters having any number of phases greater than one by modifying coupled inductor 700 to have an appropriate number of windings 710 and connecting magnetic elements 708. For example, if coupled inductor 700 is to be used in a six-phase buck converter, coupled inductor 700 would need to be modified to include two additional connecting magnetic elements 708 and two additional windings 710.

Figure 24:
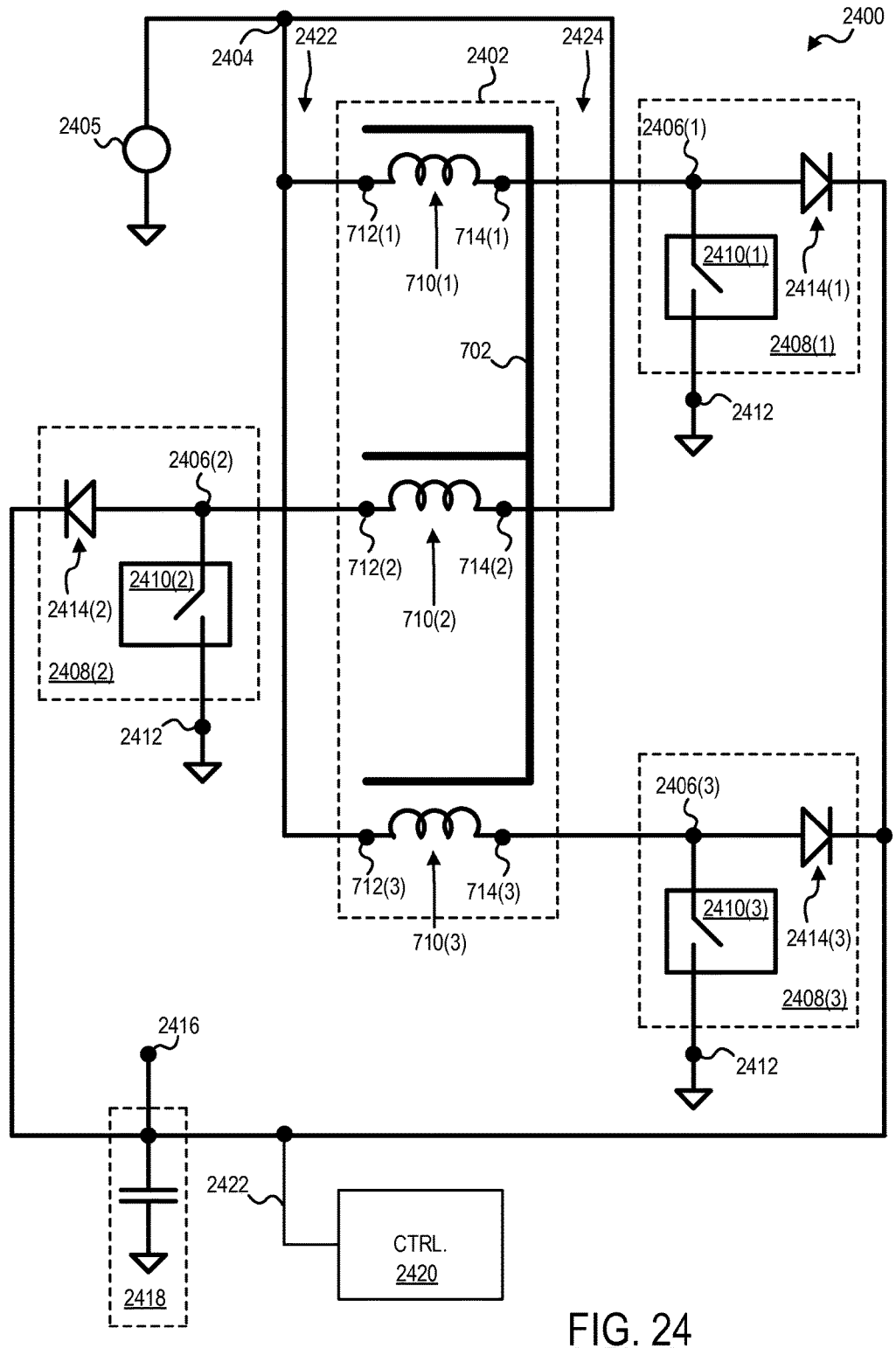
FIG. 24 shows one three-phase boost converter including an alternate embodiment of the coupled inductor of FIG. 7, according to an embodiment.

Coupled inductor 700 can also be used in switching power converters having a topology other than a buck topology, including, but not limited to, a multi-phase boost DC-to-DC converter, a multi-phase buck-boost DC-to-DC converter, and a Ćuk DC-to-DC converter. For example, FIG. 24 shows a three-phase boost DC-to-DC converter 2400 including a coupled inductor 2402. Coupled inductor 2402 is similar to coupled inductor 700 of FIG. 7, but coupled inductor 2402 is a three-phase, as opposed to a four-phase, coupled inductor.

First ends 712(1), 712(3) of windings 710(1), 710(3) and second end 714(2) of winding 710(2) are electrically coupled to an input power rail 2404. An input power source 2405 is electrically coupled to input power rail 2404. Second ends 714(1), 714(3) of windings 710(1), 710(3) and first end 712(2) of winding 710(2) are electrically coupled to a respective switching node 2406. Each switching node 2406 is also electrically coupled to a respective switching stage 2408. Each switching stage 2408 includes a respective switching device 2410 electrically coupled between its switching node 2406 and a reference power rail 2412 (e.g., a ground reference rail). Each switching stage 2408 further includes a respective diode 2414 electrically coupled between its switching node 2406 and a common output power rail 2416. Thus, each switching stage 2408 switches an end of a respective winding 710 between two different power rails—i.e., output power rail 2416 and reference power rail 2412. For example, switching stage 2408(1) switches end 714(1) of winding 710(1) between output power rail 2416 and reference power rail 2412, and switching stage 2408(2) switches end 712(2) of winding 710(2) between output power rail 2416 and reference power rail 2412. Each switching stage 2408 may be formed of discrete components or partially or fully integrated into a common package. An output filter 2418, which typically includes at least a capacitor, is also electrically coupled to output power rail 2416 to filter ripple current generated by operation of switching devices 2410.

A controller 2420 causes switching devices 2410 to repeatedly switch between their conductive and non-conductive states to deliver power to a load (not shown) electrically coupled to output power rail 2416. Controller 2420 is optionally configured to also monitor output power rail 2416 via a feedback line 2422 and control switching of switching devices 2410 to regulate voltage on output power rail 2416 and/or current delivered to a load from output power rail 2416. Controller 2420 interfaces with switching devices 2410 via control lines or a control bus (not shown), and controller 2420 typically is configured to cause switching devices 2410 to switch between their conductive and non-conductive states at a frequency of at least 100 kilohertz to prevent excessive ripple magnitude. In certain embodiments, controller 2420 regulates voltage on output power rail 2416 and/or current delivered to a load from output power rail 2416 using a PWM and/or a PFM control scheme. In alternate embodiments, controller 2420 is partially or fully integrated with one or more switching stages 2408.

Diodes 2414 may be replaced with switching devices operating under the command of controller 2420, such as to promote low forward voltage drop, to enable continuous conduction mode at light loads, and/or to enable converter 2400 to sink current. Although each phase is shown in FIG. 24 as being powered from a common input power rail 2404, converter 2400 could be modified such that two or more phases are powered from different power rails.

Due to the fact that windings 710 have alternating opposing orientations, proper magnetic coupled between windings 710 is achieved when alternating first and second ends 712, 714 of windings 710 are electrically coupled to a respective switching stage 2408. Accordingly, switching stages 2408 are alternately disposed on opposing sides 2422, 2424 of coupled inductor 2402, thereby promoting cooling of switching stages 2408.

Figure 25:
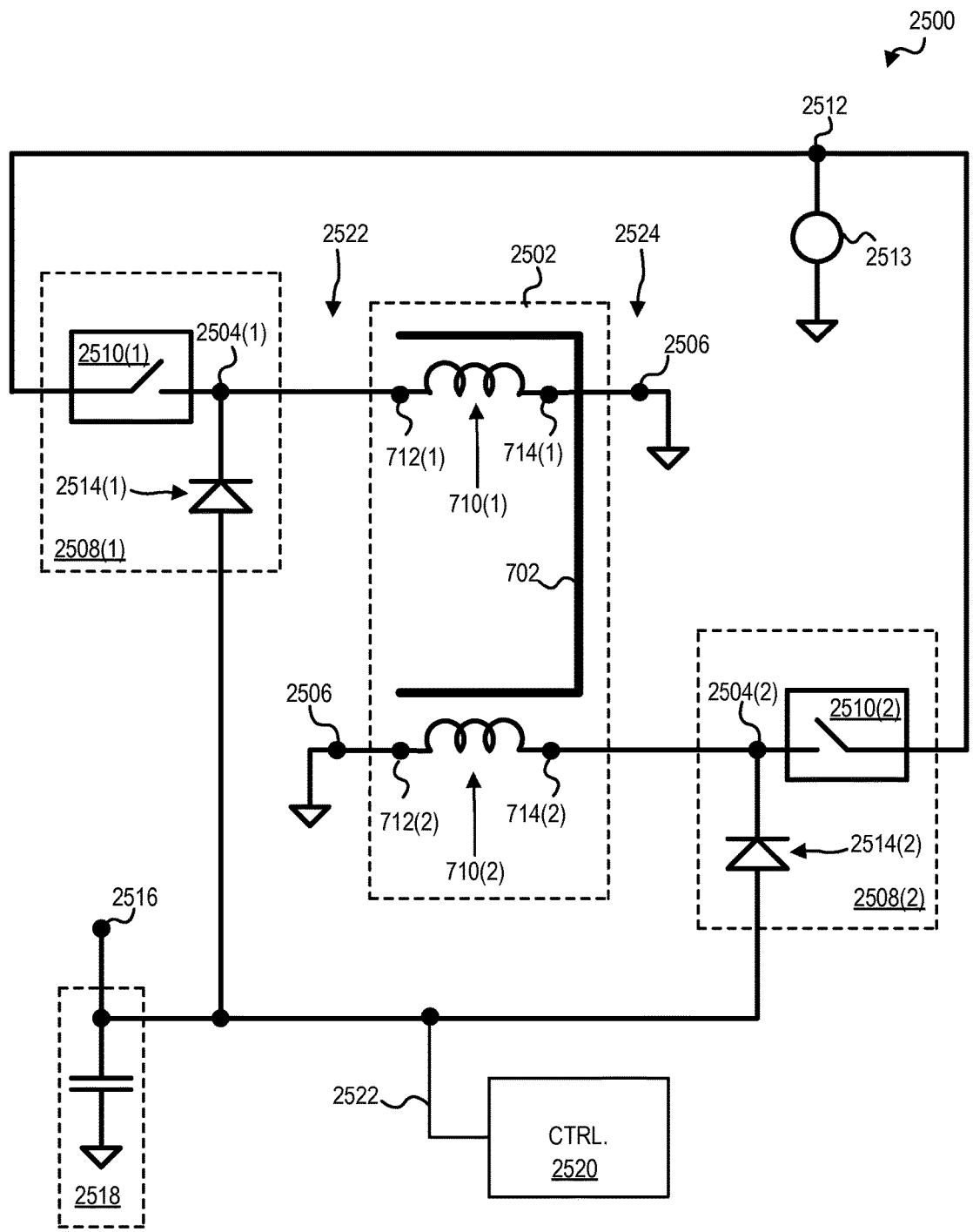
FIG. 25 shows one two-phase buck-boost converter including an alternate embodiment of the coupled inductor of FIG. 7, according to an embodiment.

FIG. 25 shows a two-phase buck-boost DC-to-DC converter 2500 including a coupled inductor 2502. Coupled inductor 2502 is similar to coupled inductor 700 of FIG. 7, but coupled inductor 2502 is a two-phase, as opposed to a four-phase, coupled inductor.

First end 712(1) of winding 710(1) and second end 714(2) of winding 710(2) are electrically coupled to respective switching nodes 2504. Second end 714(1) of winding 710(1) and first end 712(2) of winding 710(2) are electrically coupled to a common reference power rail 2506 (e.g., a ground rail). Each switching node 2504 is also electrically coupled to a respective switching stage 2508. Each switching stage 2508 includes a respective switching device 2510 electrically coupled between its switching node 2504 and an input power rail 2512. An input power source 2513 is electrically coupled to input power rail 2512. Each switching stage 2508 further includes a respective diode 2514 electrically coupled between its switching node 2504 and a common output power rail 2516. Thus, each switching stage 2508 switches an end of a respective winding 710 between two different power rails—i.e., input power rail 2512 and output power rail 2516. For example, switching stage 2508 (1) switches end 712(1) of winding 710(1) between input power rail 2512 and output power rail 2516, and switching stage 2508(2) switches end 714(2) of winding 710(2) between input power rail 2512 and output power rail 2516. An output filter 2518, which typically includes an output capacitor, is also electrically coupled to output power rail 2516 to filter ripple current generated by operation of switching devices 2510.

A controller 2520 causes switching devices 2510 to repeatedly switch between their conductive and non-conductive states to deliver power to a load (not shown) electrically coupled to output power rail 2516. Controller 2520 is optionally configured to also monitor output power rail 2516 via a feedback line 2522 and control switching of switching devices 2510 to regulate voltage on output power rail 2516 and/or current delivered to a load from output power rail 2516. Controller 2520 interfaces with switching devices 2510 via control lines or a control bus (not shown), and controller 2520 typically is configured to cause switching devices 2510 to switch between their conductive and non-conductive states at a frequency of at least 100 kilohertz to prevent excessive ripple magnitude. In certain embodiments, controller 2520 regulates voltage on output power rail 2516 and/or current delivered to a load electrically coupled to output power rail 2516 using a PWM and/or a PFM control scheme. In alternate embodiments, controller 2520 is partially or fully integrated with one or more switching stages 2508.

Diodes 2514 may be replaced with switching devices operating under the command of controller 2520, such as to promote low forward voltage drop, to enable continuous conduction mode operation at light loads, and/or to enable converter 2500 to sink current. Although each switching stage 2508 is shown in FIG. 25 as being powered from a common input power rail 2512, converter 2500 could be modified such that two or more switching stages are powered from different power rails.

Due to the fact that windings 710 have alternating opposing orientations, proper magnetic coupling between windings 710 is achieved when alternating first and second ends 712, 714 of windings 710 are electrically coupled to a respective switching stage 2508. Accordingly, switching stages 2508(1), 2508(2) are disposed on opposing sides 2522, 2524 of coupled inductor 2502, thereby promoting cooling of switching stages 2508.

As discussed above, coupled inductors having windings with alternating opposing orientations can enable disposing switching stages on alternating sides of the coupled inductor, thereby facilitating cooling of the switching stages. We have also discovered how to achieve proper magnetic coupling in certain prior art coupled inductors with switching stages disposed on alternating sides of the inductor. Such prior art coupled inductors have a ladder style core and solder tabs extending at least substantially from one side of the inductor to the other. However, in contrast with the coupled inductors discussed above, these prior art coupled inductors do not feature windings having alternating opposing orientations. These prior art coupled inductors typically have longer windings and associated winding impedances than the coupled inductors discussed above. Accordingly, it is anticipated that the coupled inductors discussed above, instead of prior art ladder core coupled inductors with solder tabs extending from one side to another, will be preferred in many applications where switching stages are disposed on alternating sides of the coupled inductor.

Figure 26:
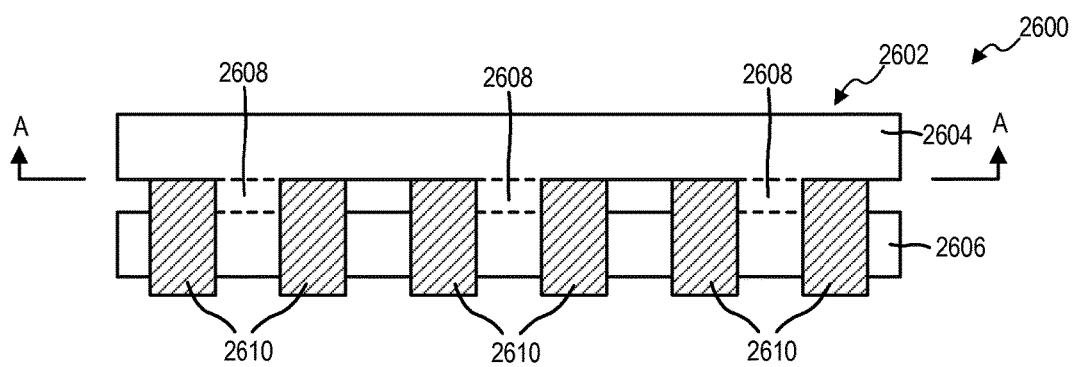
FIG. 26 shows a side plan view of a prior art coupled inductor.
Figure 27:
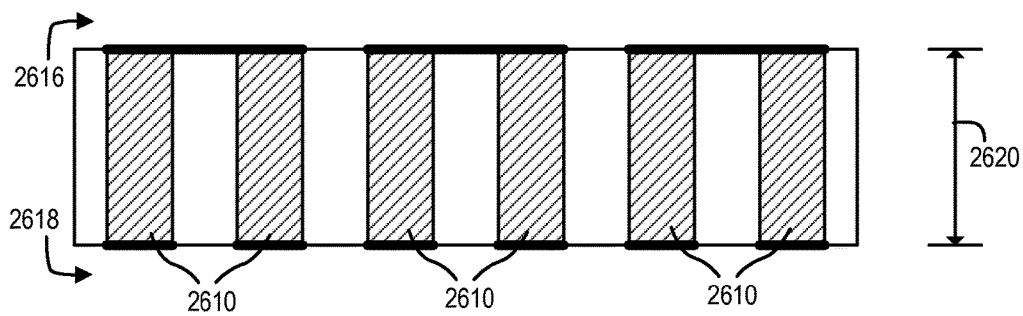
FIG. 27 shows a cross-sectional view of the coupled inductor of FIG. 26.
Figure 28:
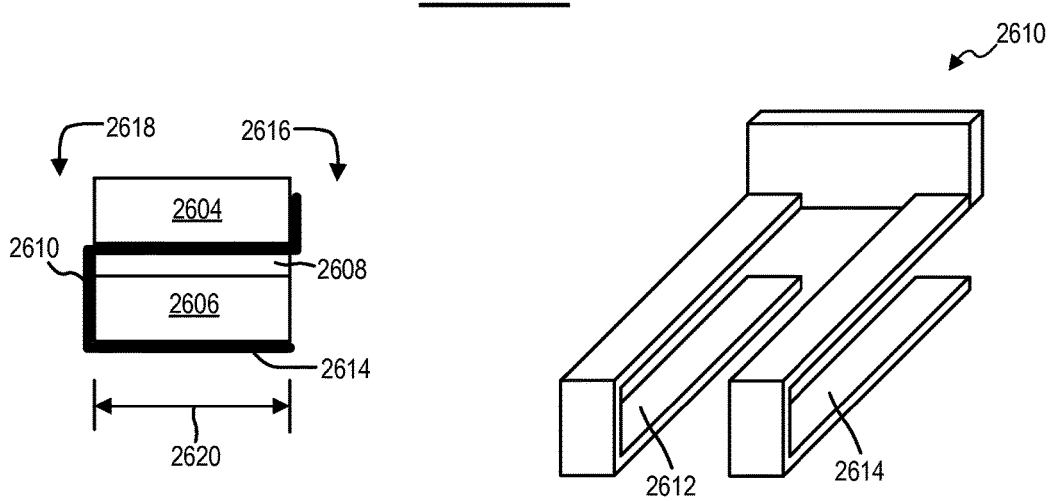
FIG. 28 shows an end plan view of the coupled inductor of FIG. 26.
Figure 29:
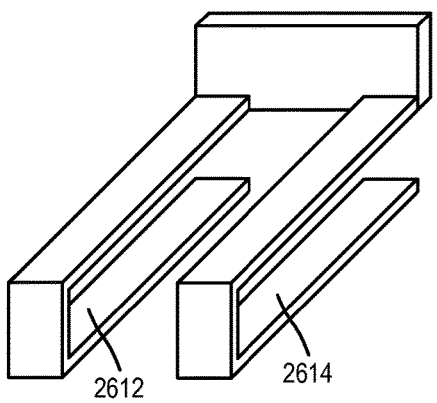
FIG. 29 shows a perspective view of one of the windings of the coupled inductor of FIG. 26.

FIGS. 26-28 show a prior art coupled inductor 2600, which can achieve proper magnetic coupling with switching stages disposed on alternating sides of the coupled inductor. In particular, FIG. 26 shows a side plan view, FIG. 27 shows a cross sectional view taken along line A-A of FIG. 26, and FIG. 28 shows an end plan view of coupled inductor 2600. Coupled inductor 2600 includes a ladder style magnetic core 2602 including first and second end magnetic elements 2604, 2606, and at least two connecting magnetic elements 2608 disposed between and connecting to end magnetic elements 2604, 2606. A respective winding 2610 is wound around each connecting magnetic element 2608. FIG. 29 shows a perspective view of one winding 2610. Each winding 2610 forms a solder tab 2612, 2614 at its ends.

Each solder tab 2612, 2614 extends at least substantially from one side 2616 to the other side 2618 of coupled inductor 2600 (see FIGS. 26 and 27). Stated differently, each solder tab 2612, 2614 extends at least substantially along a depth 2620 of coupled inductor 2600. It is anticipated that solder tabs 2612, 2614 will typically extend along at least 75% of depth 2620 to promote short PCB circuit trace length. We have discovered that this configuration of solder tabs 2612, 2614 allows proper magnetic coupling to be achieved even when switching stages are disposed on alternating sides 2616, 2618 of coupled inductor 2600.

Figure 30:
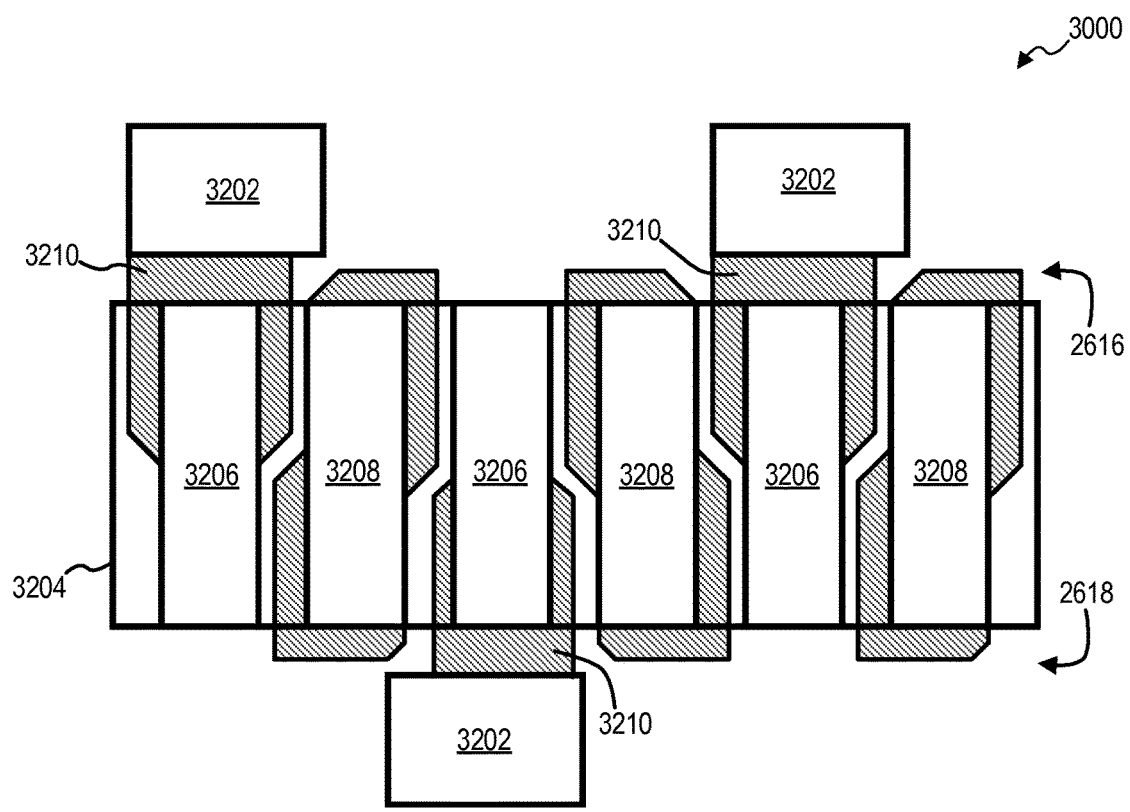
FIG. 30 shows a PCB layout using the coupled inductor of FIG. 26 with switching stages disposed on alternating sides of the coupled inductor, according to an embodiment.

For example, FIG. 30 shows one PCB layout 3000 using coupled inductor 2600 in a switching power converter application where switching stages 3202 are disposed on opposite sides 2616, 2618 of coupled inductor 2600. Rectangle 3204 denotes the outline of coupled inductor 2600. Solder tabs 2612 electrically couple to a respective switching node pad 3206, and solder tabs 2614 electrically coupled to a respective common node pad 3208. Each switching node pad 3206 is electrically coupled to a respective switching stage 3202 by a switching node PCB circuit trace 3210. Common node pads 3208 are electrically coupled together by an electrical connection, such as by another PCB circuit trace (not shown). The fact that solder tabs 2612, 2614 extend at least substantially from one side 2616 to the other side 2618 of coupled inductor 2600 allows switching stages 3202 to be near their respective winding ends while still being disposed on opposite sides 2616, 2618 of coupled inductor 3200.

Layout 3000 may be used in switching power converter applications including, but not limited to, multiphase buck, boost, or buck-boost converter applications. In multiphase buck converters applications, switching stages 3202 switch an end of a respective winding 2610 between an input power rail and a reference power rail. In multiphase boost converter applications, switching stages 3202 switch an end of a respective winding 2610 between a reference power rail and an output power rail. In multiphase buck-boost converter applications, switching stages 3202 switch an end of a respective winding 2610 between an input power rail and an output power rail.

Although coupled inductor 2600 is shown as being a three phase coupled inductor, coupled inductor 2600 could be modified to have any number of phases greater than one. Similarly, PCB layout 3000 could be modified to accommodate a coupled inductor having a different number of phases. Modifications to coupled inductor 2600 are also possible. For example, windings 2610 could be wire windings instead of foil windings, with solder tabs 2612, 2614 coupled to ends of the wire windings.

Changes may be made in the above methods and systems without departing from the scope hereof. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A switching power converter, comprising:
a coupled inductor, including:
first and second end magnetic elements,
N connecting magnetic elements each connected to both of the first and second end magnetic elements, N being an integer greater than one, and
N windings, each of the N windings wound around a respective one of the N connecting magnetic elements such that the N windings are wound in alternating opposing directions;
N switching stages, each of the N switching stages configured to switch an end of a respective one of the N windings between at least first and second power rails at a frequency of at least 100 kilohertz, the N switching stages being disposed on alternating opposing sides of the coupled inductor; and
a third power rail, each of the N windings being electrically coupled to the third power rail at alternating opposing sides of the coupled inductor.

2. The switching power converter of claim 1, each of the N switching stages comprising a switching device and a diode.

3. The switching power converter of claim 1, further comprising a controller for controlling switching of the N switching stages.

4. The switching power converter of claim 1, each of the N switching stages comprising a first and a second switching device.

5. The switching power converter of claim 1, the first and second power rails comprising an input power rail and a reference power rail, respectively.

6. The switching power converter of claim 1, the first and second power rails comprising an output power rail and a reference power rail, respectively.

7. The switching power converter of claim 1, the first and second power rails comprising an input power rail and an output power rail, respectively.

8. A switching power converter, comprising:
a coupled inductor, including:
a first end magnetic element,
a second end magnetic element,
N connecting magnetic elements, each of the N connecting magnetic elements connecting the first and second end magnetic elements in a first direction, each of the N connecting magnetic elements being separated from each other in a second direction orthogonal to the first direction, N being an integer greater than one, and
N windings, each of the N windings wound around a respective one of the N connecting magnetic elements; and
N switching stages disposed on alternating opposing sides of the coupled inductor, each of the N switching stages being offset from each other in the second direction and at least two of the N switching stages being offset from each other in the first direction, each of the N switching stages switching a first end of a respective one of the N windings between at least two different power rails at a frequency of at least 100 kilohertz.

9. The switching power converter of claim 8, wherein:
the first end of each of the N windings forms a respective first solder tab;
a second end of each of the N windings forms a respective second solder tab; and
each of the first and second solder tabs extends along at least seventy five percent of a depth of the coupled inductor.

10. The switching power converter of claim 9, N being an integer greater than two.

11. The switching power converter of claim 1, the third power rail being selected from the group consisting of an output power rail, an input power rail, and a reference power rail.

* * * * *